United States Patent [19]

Andreas et al.

[11] Patent Number: 5,517,436
[45] Date of Patent: May 14, 1996

[54] DIGITAL SIGNAL PROCESSOR FOR AUDIO APPLICATIONS

[76] Inventors: David C. Andreas, 723 Southern Dr.; Jon Dattorro, 488 Lynetree Dr., both of West Chester, Pa. 19380; J. William Mauchly, 199 Cassatt Rd., Berwyn, Pa. 19312

[21] Appl. No.: 255,262

[22] Filed: Jun. 7, 1994

[51] Int. Cl.[6] .............................. G06F 7/38; G06F 7/50
[52] U.S. Cl. .......................................... 364/736; 364/768
[58] Field of Search ............................ 364/736, 715.08, 364/745, 768

[56] References Cited

U.S. PATENT DOCUMENTS

| | | | |
|---|---|---|---|
| 4,811,267 | 3/1989 | Ando et al. | 364/736 |
| 4,817,047 | 3/1989 | Nishitani et al. | 364/745 |
| 5,140,543 | 8/1992 | Tanaka | 364/736 |
| 5,208,770 | 5/1993 | Ito | 364/745 |
| 5,260,897 | 11/1993 | Toriumi et al. | 364/736 |
| 5,311,458 | 5/1994 | Haines | 364/736 |
| 5,347,480 | 4/1994 | Asghar et al. | 364/736 |

OTHER PUBLICATIONS

Philips brochure of Electronic components and materials, "PCB 5010/PCB 5011 Programmable DSPs", cover, pp, 2–7 and p. 48 which reflcets date of Feb. 1986.
Y. Matsushita et al., "A 32/24 Bit Digital Audio Signal Processor," IEEE *Transactions on Consumer Electronics*, vol. 35, No. 4, at pp. 785–792 (Nov. 1989).
R. J. Gredin, "The NEC uPD77230 Advanced Signal Processor", presented at Mini/Micro Northeast–86, pp. 1–6 (1986).
"ADSP–2100 Internal Architecture" from ADSP–2100 Seminar of Analog Devices, Inc., Cover, Contents page and pp. 2–5 to 2–14 (1986).
Motorola DSP56000 Digital Signal Processor User's Manual, Chapter 3: Chip Architecture, cover, copyright page, pp. 3–1 to 3–17 (1986).
Texas Instruments TMC57000/57001 Digital Audio Signal Processor User's Manual, cover & pp. 2–1 to 2–20 (1990).
Texas Instruments TMS320C3x User's Guide, Chapter 2: Architectural Overview, cover and pp. 2–1 to 2–26 (1990).
Analog Devices ADSP–2100 User's Manual, cover, copyright page and pp. 1–1 to 2–34 (1986).
Sony Computer Audio/Video Semiconductor Data Book 1992, Index page and "CXD1160AP/AQ Digital Audio signal processing LSI" at pp. 299–300 (1992).
Dream "SAM8905 digital sound generator/processor for musical applications" User's Manual, cover and pp. 6–7 (Jun. 1991).
AT&T Preliminary Data Sheet WE DSP32 Digital Signal Processor, pp. 1–4 (Apr. 1986).

*Primary Examiner*—David H. Malzahn
*Attorney, Agent, or Firm*—Ratner & Prestia

[57] ABSTRACT

A digital signal processor for efficiently handling audio applications is disclosed. The single chip digital signal processor includes an on-chip instruction memory for outputting instructions representing an audio application program. Four busses, W, X, Y and Z, provide communication within the processor. An ALU performs a plurality of arithmetic and logical functions according to the instruction memory. Specialized implementations for functions have been specially developed for audio applications, for example, a single cycle average instruction, a jump on condition code instruction, a repeat instruction, a limit instruction. A Multiplier Accumulator/Barrel Shifter performs a plurality of MAC and shifting functions according to the instruction memory. The MAC/BS is coupled in parallel with the ALU and an Address Generator. The Address Generator performs a plurality of address calculation functions according to the instruction memory. Some of the data storage areas include: 1) a GPR memory for writing data to the X and Y busses and reading data from the Z bus; 2) an AOR memory for writing data to the W, X, and Y busses and reading data from the Z bus; and 3) an SPR memory for writing data to and reading data from the X, Y and Z busses and for outputting control information to the ALU, the MAC/BS and the AGEN.

22 Claims, 11 Drawing Sheets

DIGITAL SIGNAL PROCESSOR FOR AUDIO APPLICATIONS

FIELD OF THE INVENTION

The invention relates generally to digital signal processing and, more particularly, it relates to a single chip digital signal processor specifically designed to efficiently handle audio applications.

BACKGROUND OF THE INVENTION

As the multi-media market continues to grow, demands for smaller, more powerful tools to implement the multi-media products also grow. One area in which the demands generally outpace the technology of the tools is digital signal processing and, in particular, digital signal processing specifically designed for audio applications.

There are many digital signal processing chips currently in use and presently competing for market share. An example of a digital signal processing chip currently in use is the Ensoniq Signal Processor (ESP). The ESP chip has been used in keyboards shipped to customers since 1989.

FIG. 1 illustrates the overall architecture of the ESP including the use of a general purpose ALU 102 and multiplier 104/accumulator 106 coupled together by three busses X, Y and Z. Also shown in FIG. 1 are the data in/out latches 108a/108b, an address generator 110 and data storage areas including microcode memory 112, GPRs 114 and SPRs 116.

The architecture shown in FIG. 1 has several deficiencies. Primary deficiencies include the double usage of GPRs as general purpose registers and as DRAM offsets to external memory. When used as DRAM offsets, the GPR used is constrained to have the same address as the line of microcode which requests the DRAM access.

Secondary deficiencies include the lack of a general purpose barrel shifter which is useful for fixed point arithmetic at various radices. There are few provisions for double precision arithmetic. External memory accesses can only be queued two-deep. The ALU has only 16 instructions, and no provision for branching.

Therefore, the ESP functional units can only work on two operands; i.e., one of the source operands must be a destination as well.

However, as technology advances allowing more functions to reside on a single chip, new improvements to overcome the deficiencies of prior architectures can provide a powerful yet cost-effective audio digital signal processor.

SUMMARY OF THE INVENTION

The present invention involves a digital signal processor which efficiently handles audio applications. It includes an instruction memory for outputting instruction words representing an audio application program; four time-division multiplexed busses, W, X, Y and Z, which provide data communication within the digital signal processor; an ALU which performs a plurality of arithmetic and logical functions according to an instruction word, the ALU uses data received from the X and Y busses and places the results on the Z bus; a Multiplier Accumulator/Barrel Shifter (MAC/BS) which performs, in parallel with the ALU, a plurality of MAC and shifting functions according to an instruction word; an Address Generator (AGEN) which performs a plurality of address calculation functions according to an instruction word, using input values provided by the W bus and providing output values to to an external data port; a general purpose register (GPR) memory, responsive to an instruction word, for writing data to the X and Y busses and reading data from the Z bus; an address offset register (AOR) memory, responsive to an instruction word, for providing data to the W, X, and Y busses and for reading data from the Z bus; and a special purpose register (SPR) memory, responsive to an instruction word, for writing data to and receiving data from the X, Y and Z busses and for providing control information to the ALU, the MAC/BS and the AGEN.

BRIEF DESCRIPTION OF THE FIGURES

The invention is best understood from the following detailed description when read in conjunction with the accompanying drawings, in which.

DETAILED DESCRIPTION OF THE INVENTION

Figure 1:
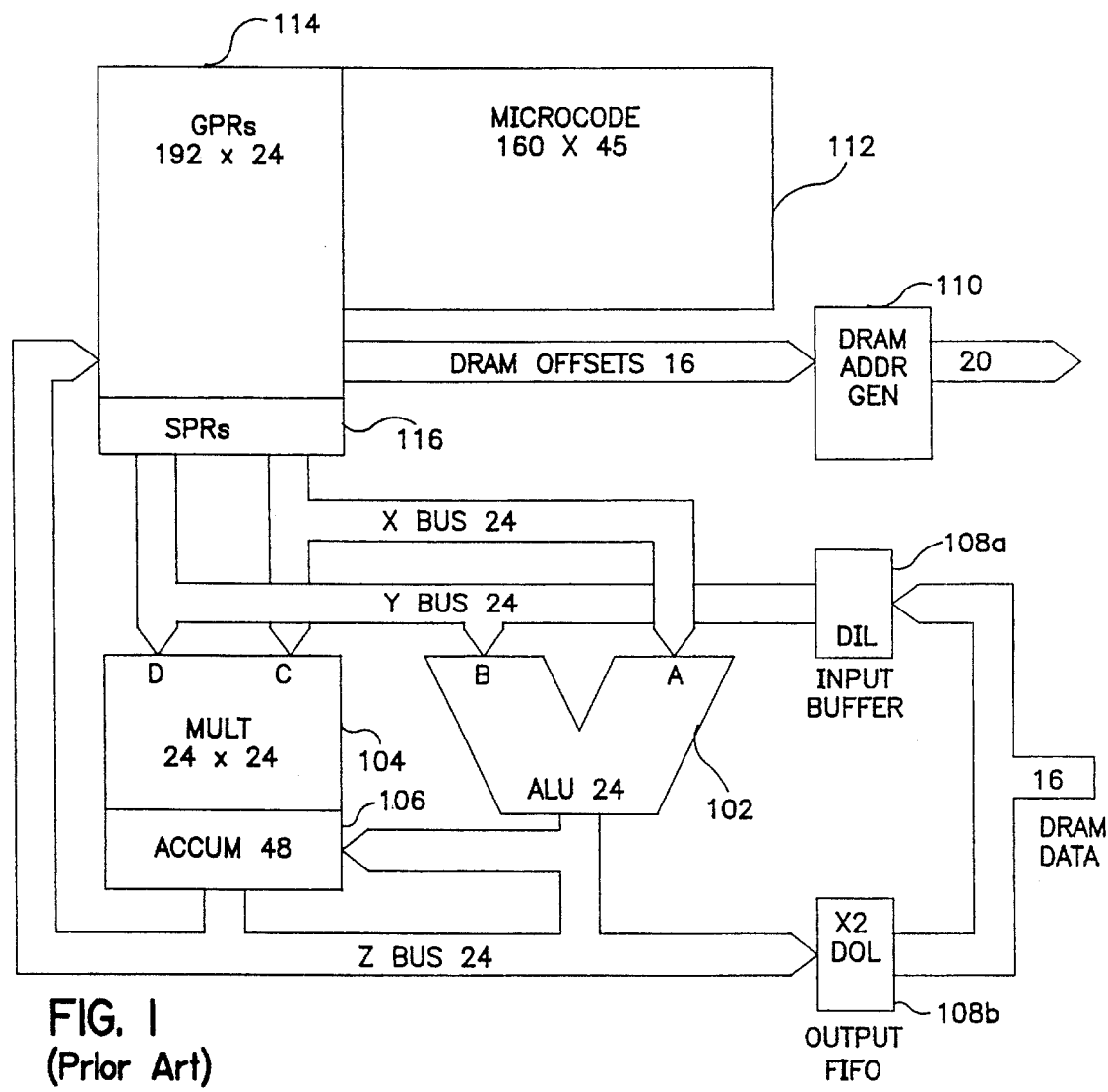
FIG. 1 is a functional block diagram of a prior art architecture for an audio digital signal processor (ESP)
Figure 2:
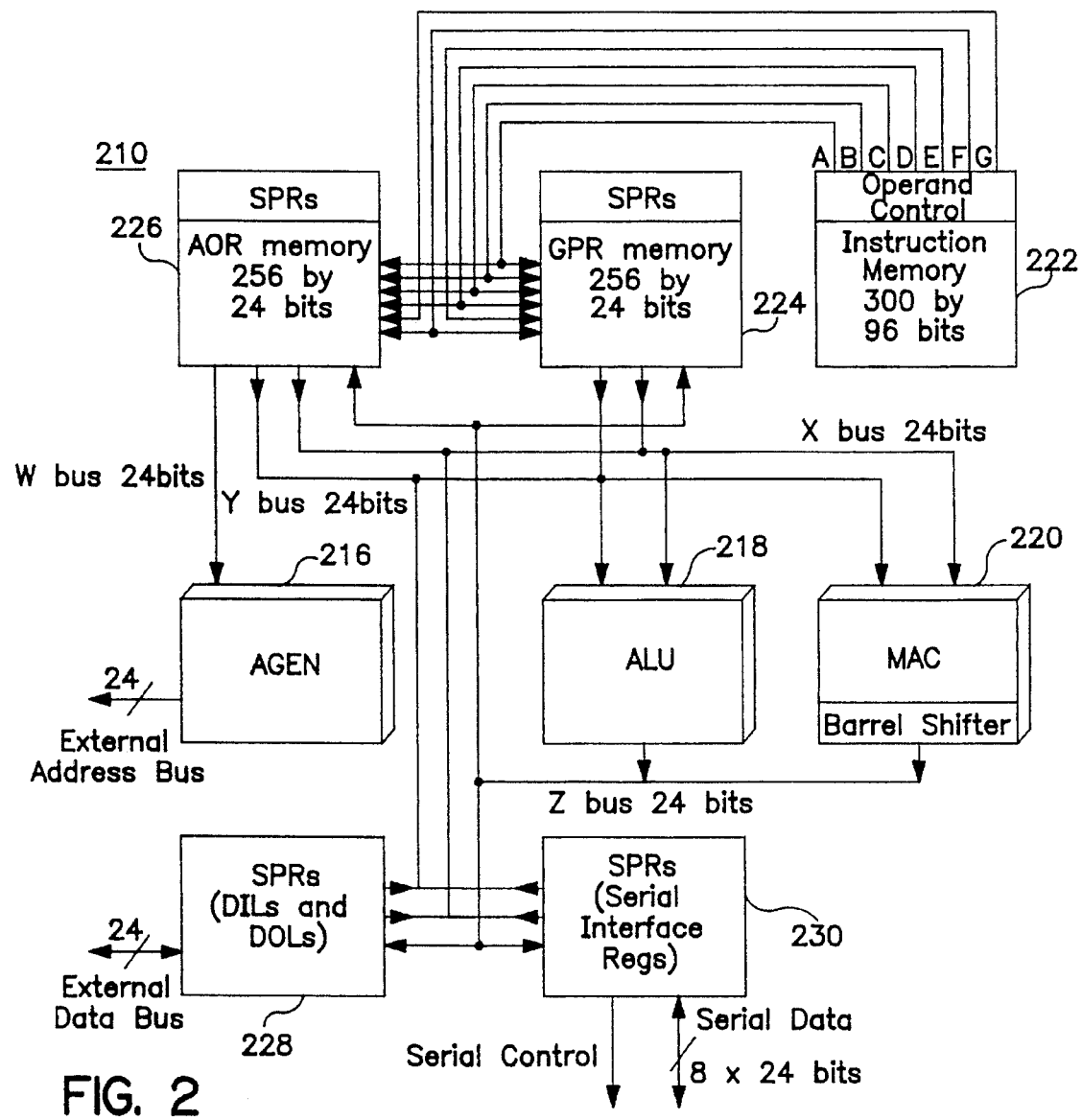
FIG. 2 is a functional block diagram of an overall architecture for an audio digital signal processor employing the present invention (ESP2)

FIG. 2 shows an exemplary overall architecture of a single chip audio digital signal processor 210 employing the present invention. The architecture of FIG. 2 represents the next generation ESP—or ESP2. The new improved ESP2 architecture has many advantages over the above-described ESP architecture including a more efficient overall configuration and specially designed functional units, namely ALU 218, Multiplier Accumulator/Barrel Shifter (MAC/BS) 220 and Address Generator (AGEN) 216. In particular, ALU 218 and AGEN 216 are specifically designed to more efficiently perform functions particular to audio applications, and MAC/BS 220 is specifically designed to allow for greater flexibility in accumulations as well as greater numerical accuracy.

Also shown in FIG. 2 are multiple data storage areas. The data storage areas include instruction memory 222, general purpose register memory (GPR) 224, address offset register memory (AOR) 226, and various special purpose registers (SPRs) including data-in and data-out latches (DILs/DOLs) 228 and the serial interface registers 230. It should be noted that although some SPRs are shown as being attached to GPR 224 and AOR 226, this simply represents the fact that the SPRs are mapped into the memory space for each of the respective memories; but, in the actual layout, the SPRs are spread throughout the ESP2 chip, for example, within ALU functional block 218.

As mentioned, the ESP2 architecture is optimized for processing audio signals. The demands of audio dictate a minimum single precision data bit-width of 24 bits. A prominent feature of this architecture is the parallel configuration of AGEN 216, ALU 218, and MAC/BS 220. In the exemplary embodiment, instruction memory 222 is 96 bits in width and completely on chip (i.e., there is no provision for off-chip program memory), in order to be capable of supporting the parallel architecture so that AGEN 216, ALU 218 and MAC/BS 220 can function in parallel.

Both ALU 218 and MAC/BS 220 perform three operand instructions (i.e., two input operands and one output operand) directly on the registers in GPR 224. AGEN 216 is supported by AOR 226 which, in the exemplary embodiment, is distinct from the other memories. This separation of memories facilitates random access of audio data off-chip on each instruction cycle. Additionally, this separation, due to the parallel fetching of an offset and operand, allows the use of a 2-phase microinstruction cycle rather than the 3-phase microinstruction cycle employed in the ESP architecture.

AOR 226 provides address offsets to modulo address calculation mechanisms of AGEN 216. Unlike conventional digital signal processing chips, AOR 226 facilitates the design of sparse digital networks which is very useful for some types of audio signal processing, e.g., digital reverberators. Additionally, AOR 226 is accessible by ALU 218 and MAC/BS 220 for the purpose of modulating addresses. This is useful for time-varying processes.

Internal Operand Busses

As seen in FIG. 2, the overall ESP2 architecture employs four 24-bit data busses, W, X, Y, and Z. The X, Y and Z busses are time-division multiplexed for fetching and writing ALU 218 and MAC/BS 220 operands. These busses connect to GPR 224, AOR 226, ALU 218, MAC/BS 220, and to all SPRs including 228 and 230. In the exemplary embodiment, the input operands for ALU 218 are designated A and B while its output operand is designated C; for MAC/BS 220, the input operands are designated D and E while the output operand is designated F; finally, the operand destined for AGEN 216 is designated G.

As shown in FIG. 2, the addresses for the above operand designations—A through G—are provided by instruction memory 222 to the separate data storage areas. It should be noted that the addresses contained in the microinstruction word corresponding to these operands have the same designations as seen in Table I.

The contents of a register, whether in GPR 224, AOR 226 or an SPR, specified as the A operand for ALU 218 is fetched on the X bus, and the D operand for MAC/BS 220 is also fetched on the X bus. The register specified as the E operand for MAC/BS 220 is fetched on the Y bus. The AOR register addressed as the G operand for AGEN 216 is fetched on the W bus. The Z bus is used to deliver results to the registers (GPR 224, AOR 226, or SPRs) designated by operands C and F from the outputs of ALU 218 and MAC/BS 220, respectively.

MAC/BS 220 and ALU 218 share the X, Y, and Z busses by time-multiplexing their use on different phases of a 4-phase microinstruction cycle. It should be noted that the W bus is actually sourced by the same read port of AOR 226 as the Y bus. This means that AOR 226 cannot supply both the W bus and the Y bus with data during the same clock phase which is the reason why, in the exemplary embodiment, the E operand for MAC/BS 220 is fetched on the Y bus (see FIG. 2, the E operand address from instruction memory 222 only goes to GPR 224). The internal bus cycle timing is described in detail below with reference to FIG. 9.

Functional Units: ALU 218, AGEN 216, MAC/BS 220

The instruction set for ALU 218, for which specialized instructions are described in detail below with reference to FIGS. 4–10, consists of 32 standard, non-standard, and boolean instructions. All of the instructions handle two source operands and a separate destination operand. The non-standard functions are used for functions such as Fast Fourier Transform (FFT) generation, envelope generation, stereo to mono signal conversion, etc. A prominent feature of ALU 218 is the group of specialized instructions, as described in detail below, which facilitate digital signal processing for audio applications.

ALU 218 also supports program control instructions which allow conditional branching. Conditional branching allows a program to jump over parallel instructions to ALU 218, MAC/BS 220 and AGEN 216. Also provided in ESP2 is a separate mechanism which allows for conditional execution of individual instructions within any or all of the three units, this is referred to as "skipping" an instruction. Special skip bits are set out in the microinstruction word for each functional unit.

The instruction set for MAC/BS 220 consists of 20 instructions which provide variations of multiply, accumulate and/or shift operations. A barrel shifter 324 (see FIG. 3) is integral to MAC/BS 220. Shifter 324 is available on a per-instruction basis and can be accessed by ALU 218. Barrel shifter 324 can operate on either the input value to accumulator 322 or the output value of MAC/BS 220. A prominent feature of MAC/BS 220 is the ability to selectively inhibit writing the accumulator MAC 332 latch while sending an accumulated result to a destination register.

AGEN 216 performs modulo addressing of 8 regions simultaneously located anywhere in physical memory and of any size. A region is a programmer determined subdivision of external memory (DRAM), which is recognized by the hardware in the form of 8 sets of SIZEM1, BASE, and END REGISTERS. When these registers are properly loaded, the defined region is protected against overwriting by operations taking place in other regions. Each region appears to the programmer as a circular queue. This comes about due to the modulo addressing mechanism of the hardware. Each region can support multiple delay lines, or tables. A multiplicity of regions facilitates memory allocation for separate (co-resident) DSP applications.

Within each region numerous delay lines can be defined having region offsets which are determined by the multiplicity of AOR 226 locations. AGEN 216 also provides for automatic plus one address increment operations and automatic region base update. A region is uniquely identified by SIZEM1 and END SPRs. Additionally, AGEN 216 provides for absolute addressing as is typically required, for example, in the cases of table lookup and peripheral I/O.

GPR 224 and AOR 226

Referring back to FIG. 2, in the exemplary embodiment, GPR 224 and AOR 226 are large dynamic arrays of 24-bit wide registers. GPR 224 and AOR 226 each have two read ports and one write port. Again, although in FIG. 2 it appears that AOR 226 has three read ports, bus W is actually sourced by the same read port as bus Y. Each of the ports is accessed twice per instruction cycle. This provides a virtual set of four read ports and two write ports per instruction cycle for each of the memories. The total for ESP2 then becomes 8 reads and 4 writes while ESP has only 6 reads and 3 writes per instruction cycle.

GPR 224 read ports allow two operand fetches for ALU 218 and two for MAC/BS 220 in an instruction cycle. The two write ports allow one result write by ALU 218 and one by MAC/BS 220.

AOR 226 holds address offsets for AGEN 216. The four read ports of AOR 226 allow one offset fetch for AGEN 216, one operand fetch for MAC/BS 220, and two operand fetches for ALU 218. The two write ports of AOR 226 allow for one result write by ALU 218 and one by MAC/BS 220.

Because, in the exemplary embodiment, GPR 224 and AOR 226 are implemented as dynamic RAM, they need to be refreshed to maintain the data. The mechanism for refreshing these registers is described below.

In the exemplary embodiment, the address map allows for as many as 458 storage locations in GPR 224 and 466 storage locations in AOR 226; however, only 256 locations for GPR memory and 256 locations for AOR memory are presently implemented.

Special Purpose Registers (SPRs)

SPRs are implemented as static registers for holding data specific to a functional unit or interfacing with the external ports of the ESP2 chip. Chip control and status registers such as the program counter (PC) and the condition code register (CCR) are mapped as SPRs to provide the host with access to these functions. Because many of these registers are modified by internal chip operations, they have been implemented as static registers and are not refreshed.

SPRs are accessible in all of the same modes as GPR 224. As mentioned, SPRs are divided up over the division between GPR 224 and AOR 226 address space, this is to avoid restricting either data register type in future versions.

CONDITION CODE REGISTER (CCR)

Associated with ALU 218 is the Condition Code Register (CCR) (not shown in FIG. 2) which is used for conditional execution of instructions and for branching decisions. As mentioned, the CCR is mapped in the SPR address space.

Seven bits of the CCR reflect the arithmetic status of the system, particularly the result of the previous ALU operation. The eighth bit (IFLG) reflects the state of an external pin, the remaining bit (IOZ) reflects the state of the internal IOZ bit located in a HOST_CNTL register which, in turn, is a function of the external IOZ pin. The upper bits of this 24-bit register are read as zeros as are all SPRs which use less than the full 24 bits of width. The LSBs are mapped as shown in Table I:

TABLE I

| BIT 8 | 7 | 6 | 5 | 4 | 3 | 2 | 1 | 0 |
|---|---|---|---|---|---|---|---|---|
| IOZ | IFLG | NB | NA | N | C | V | LT | Z |

The CCR contains 5 flags which are derived in most ALU operations from basic arithmetic results: Z (zero result) C (carry out), N (negative result) and V (result overflowed). The LT (less than) flag is computed by

LT=V XOR N' where N' is the sign of the result before saturation. Having the LT flag allows simple detection of a less than condition.

An example of how the LT flag is set is described as follows using a SUBREV instruction:

SUBREV A, B>C which is functionally implemented as C=A−B.

Following this instruction, the LT flag is set according to whether A was less than B.

The sixth and seventh flags, NA and NB, hold the sign of the A and B inputs to the previous ALU operation.

The eighth flag is IFLG and it is an image of the IFLAG pin. The IFLAG pin is an asynchronous input to the ESP2 which is internally synchronized by the ESP2. This causes the state of the IFLG bit to change synchronously with the updating of the remaining flag bits by ALU 218.

The ninth flag IOZ reflects the state of the IOZ bit which appears in the HOST_CNTL_SPR register and the HOST_CNTL interface register, and which is used by the BIOZ instruction. The BIOZ instruction is discussed in detail below with reference to FIGS. 6a and 6b.

Because the CCR is mapped as an SPR, it can be read from and written to like any SPR. However, it should be noted that the IFLG and IOZ flag are read-only and writing the CCR does not affect their state. The IOZ flag can be modified by writing to the HOST_CNTL_SPR register.

Instruction Memory

In the exemplary embodiment, instruction memory 222 is a dynamic memory array which allows for as many as 1024 words at 96-bits/each; however, only 300 words are presently implemented. It is the sufficiently long 96-bit instruction word which allows for parallel operation of all the internal memory fetches as well as the parallel execution of the functional units.

Each memory cell has one write port and one read port and cycles at twice the instruction rate. This allows one cycle for instruction fetching, and a read/write cycle for refreshing or host access to the array. Refresh of the instruction memory 222 is transparent to a programmer and is discussed in detail below.

External Interfaces (DILs, DOLS, Serial Registers)

There are two mechanisms for interfacing to external devices and memory. The first mechanism is a combination of a 24-bit address bus and a 24-bit data bus for accessing delay lines and tables stored in external memory (not shown). These busses can also be used to access memory mapped I/O devices (not shown). AGEN 216, under program control, computes the addresses for this address bus. SPRs (DILs and DOLs) 228 provide the interface to the external data bus for incoming and outgoing data. The bus cycles once per instruction cycle.

The second interface consists of 8 serial data ports. Each of the ports can be configured as an input or output port. There are two fully programmable sets of clock signals for controlling the timing of data transfers on the serial data lines, and each data line can be assigned to either set of clock signals. In addition, the serial clock signals can be disabled to allow external devices to dictate the serial timing. Serial Interface Registers 230, which are SPRs, provide the interface to the external serial control and data busses.

MAC/BS 220

Figure 3:
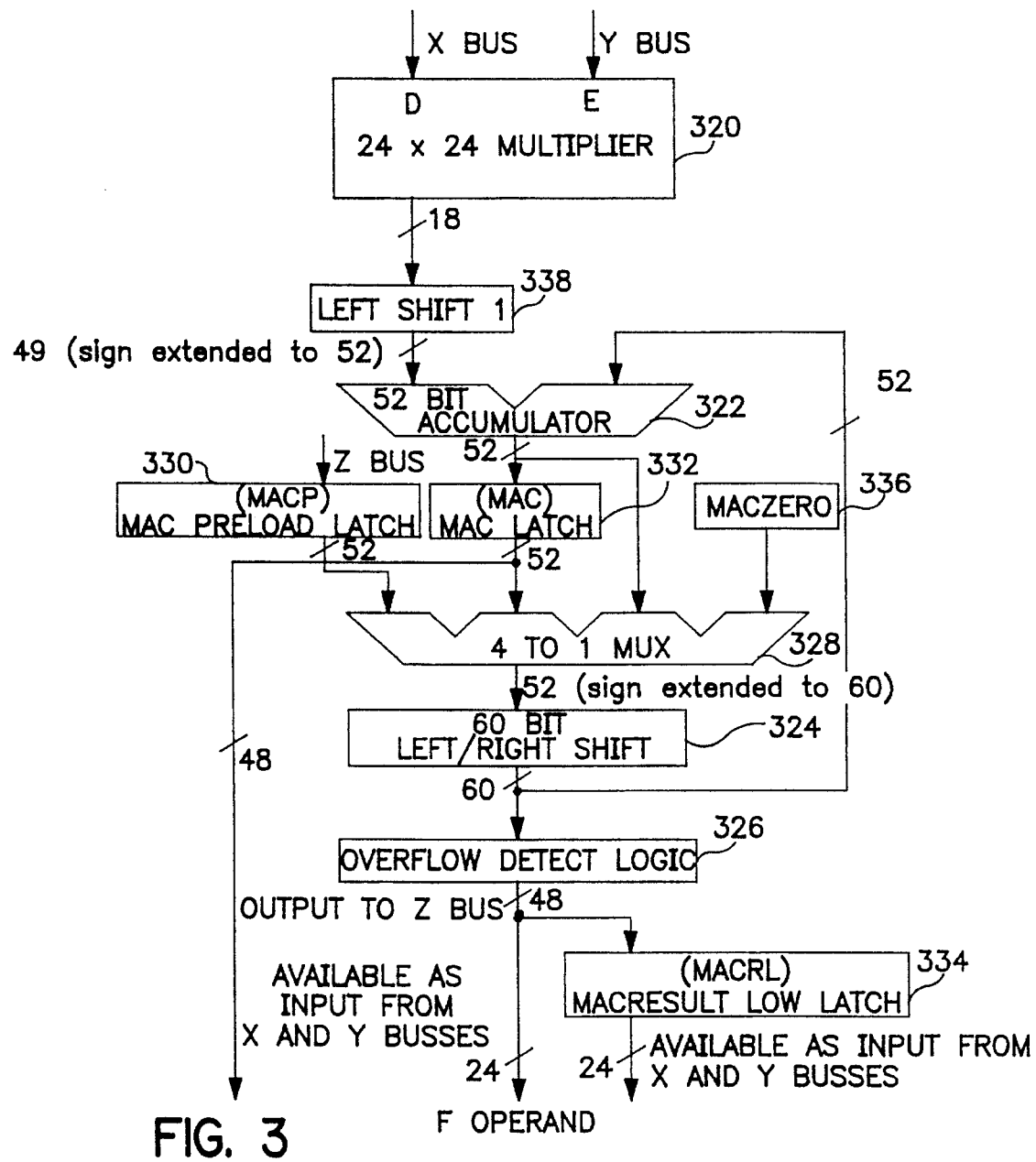
FIG. 3 is a more detailed functional block diagram of the MAC/BS of FIG. 2.

FIG. 3 is a detailed functional block diagram of the exemplary embodiment of MAC/BS 220. The exemplary embodiment of MAC/BS 20 includes a 24×24-bit multiplier 320, a 52-bit accumulator 322, a 60-bit left/right shifter 324, overflow detect logic 326, a 4 to 1 MUX 328 and various latches MAC Preload latch (MACP) 330, MAC latch 332 and MAC Result Low latch (MACRL) 334. Multiplier 320 receives its input values via the X and Y bus from registers specified by the D and E operand fields of the instruction. Accumulator 322 adds or subtracts the 48-bit multiplication product (having appended 4 bits of sign extension) to the 52-bit value selected by MUX 328 as the other input value to accumulator 322 (e.g., MAC latch 332). The 4 extra bits provide 4 guard bits for use in detecting overlow in the result. The result obtained by accumulator 222 is then stored in MAC latch 332.

During the first half of an instruction cycle, when accumulator 322 is being loaded, the MUX 328 selects, as the input value to the shifter 324, either MAC latch 332, the constant MACZERO 336, or MAC PRELOAD latch (MACP) 330. These three input options allow: 1) accumulation of the multiplier product with the previous accumulator output, 2) multiplication without accumulation, and 3) accumulation of the multiplier product with a sign extended 52-bit preload value.

An advantage of MUX 328 and its positioning relative to accumulator 322 is that an accumulator value stored in MAC latch 332 can be preserved if the microinstructions of the program so dictate. Additionally, shifting can take place on input data (i.e., data from MACP 330 or MAC LATCH 332) or output data (e.g., data from MAC latch 332). It should be noted that the above-described configuration also provides for normalization of input values to accumulator 322.

Because shifter 324 is positioned within the feedback loop and before the overflow detect logic 326, the value held in the accumulator may be accessed before saturation operations are performed, which means that value overflows which occur as intermediate steps in a sequential operation can correct themselves in the accumulation process without reaching and triggering the overflow detect logic 326.

In the second half of the instruction cycle, there are four destination options: 1) the 24 MSBs of the result can be written out to a destination register (via the Z bus) bypassing MAC latch 332, 2) to a destination register while a 52-bit value is written to the MAC latch 332, 3) double precision shifted to a destination register but not shifted to the MAC latch 332, and 4) double precision shifted to a destination register, but not to the MAC latch 332 at all.

As shown in FIG. 3, the accumulator result propagates through MUX 328, shifter 324, and overlow detect logic 326 to reach the Z bus for writing to a destination register. Shifter 324 and overflow detection logic 326 are separate, as mentioned above, so that only the final result of a series of multiply/accumulate/shift operations is checked and, if necessary, becomes saturated before being written to a destination.

In the exemplary embodiment, shifter 324 performs a 60-bit arithmetic shift of 0 to 8 bits left or 0 to 7 bits right. Since an instruction contains only one shift amount, shifter 324 can shift either the accumulator input or the result to the destination register, but not both in the same instruction cycle. Sign extension of the 52-bit output of MUX 328 is required because of the maximum possible shift left of 8 bits.

Overflow detect logic 326 checks the 13 MSBs of the output value provided by shifter 324 for overflow. The overflow condition exists if the 13 bits are not all in the same state. When overflow has occurred the output is saturated to h7FFFFF,FFFFFF (the largest positive number that can be represented by a 48-bit word) if the MSB of the shifter input is a 0, or to h800000,000000 (the largest negative number) if the MSB of the shifter input is a 1. It should be noted that the "h" prefix signifies that a hexadecimal format is being used.

Again, saturation occurs only at the output, i.e., there is no saturation of intermediate accumulator results stored in MAC latch 332.

Shifter 324 can perform shifts on any of the data sources coupled to MUX 328. Shifter 324 performs a shift in the range of +8 to −7 of its 52-bit input value. It should be noted that since the product of the 24×24-bit fixed point multiply has two sign bits, a fixed shift left by 1 normalizing shifter 338 is designed into the data path.

The guard bits employed by MAC/BS 220 can be examined by one of two means: reading directly from MAC latch 332, or writing the MAC result to a destination. It should be noted that this is done by first right shifting the guard bits into the MAC/BS 220 result.

Accessing MAC/BS 220

The MAC Preload latch (MACP) 330 is accessible as two pairs of 24-bit write-only registers, MACP_H and MACP_L and MACP_HC and MACP_LS.

Writing the MACP

When MACP_H or MACP_L are written, the 24-bit value is written into the indicated half of MACP 330. Any write to the upper half of the latch is sign extended into the four guard bits to create a full 52-bit word.

When MACP_HC is written, the 24-bit value is written into the upper half of MACP 330 and the lower half is cleared to all zeros. When MACP_LS is written, the 24-bit value is written into the lower half of MACP 330 and the upper half is written with the sign extend of the value in the lower half. This allows initialization of the full 52 bits of the accumulator value from ALU 218 in one instruction cycle.

MACP 330 can be used in a computation instead of MAC latch 332 as dictated by program control. MACP 330 retains a value until it is written again. Due to the instruction timing of ALU 218 and MAC/BS 220, the value written by ALU 218 into MACP 332 during instruction N is available for accumulation 2 instructions later (i.e., instruction N+2).

Reading MAC latch 332

MAC latch 332 is readable as a pair of 24-bit registers MACH and MACL, for use as operands in ALU 218 or MAC/BS 220 with normal latencies as described below. Since MAC latch 332 is positioned in the topology before overflow detection logic 326, values read from MAC latch 332 do not saturate. This is so because, as seen in FIG. 3, direct access to MAC latch 332 is available via a path which bypasses MUX 328, shifter 324 and overflow detect logic 326 and leads to the X and Y busses. The same latency rules apply to the reading of MAC latch 332 as for reading any other register.

MAC Result Low Latch (MACRL) 334

On every cycle, the low 24 bits of the overflow detect logic 326 output are written to MACRL 334 which is mapped as an SPR, thus, it is accessible by MAC/BS 220 and ALU 218. Storing the low word allows double precision arithmetic using all 48 bits of the final result of MAC/BS 220. If desired, reading the MACRL 334 should occur before it is overwritten by MAC/BS 220 in the next instruction. An exception is when MAC/BS 220 is executing NOPs in which case the contents of MACRL 334 are preserved.

MAC/BS 220 Instructions

The instructions executed by MAC/BS 220 are three operand instructions of the form D×E=>F where "=>" represents the assignment of the expression on the left to the register on the right. The D and F operands can be fetched from any location in GPR 224, AOR 226 or any SPR. The E operand can be fetched from any location in GPR 224 or any SPR. The F operand is the destination. Results of the accumulation are stored in MAC latch 332 (which is mapped as an SPR) for use in the next accumulation and for use by ALU 218 or MAC/BS 220 as a source operand. Some instructions allow for an accumulation operation while inhibiting the writing of MAC Latch 332 as a destination, this is to preserve its contents for future use.

The following instruction types can be executed by MAC/BS 220:

TABLE II

| | |
|---|---|
| (MACZERO + D X E) >> n | => F while MACZERO + D X E => MAC |
| (MACZERO − D X E) >> n | => F while MACZERO − D X E => MAC |
| (MACZERO + D X E) >> n | => F |
| (MACZERO − D X E) >> n | => F |
| (MACP + D X E) >> n | => F while MACP + D X E => MAC |
| MACP >> n + D X E | => F,MAC |
| MACP >> n − D X E | => F,MAC |
| MACP >> n + D X E | => F |
| MACP >> n − D X E | => F |
| MAC >> n + D X E | => F,MAC |
| MAC >> n − D X E | => F,MAC |
| MAC >> n + D X E | => F |
| MAC >> n − D X E | => F |
| (MACP − D X E) >> n | => F while MACP − D X E => MAC |
| (MACP + D X E) >> n | => F |
| (MACP − D X E) >> n | => F |
| (MAC + D X E) >> n | => F while MAC + D X E => MAC |
| (MAC − D X E) >> n | => F while MAC − D X E => MAC |
| (MAC + D X E) >> n | => F |
| (MAC − D X E) >> n | => F |

It should be noted that the ">>n" in the above instructions represents an instruction to barrel shifter 324 to shift its input by n places. If n is positive, there is a shift to less significant bit positions; if n is negative, it is a shift to more significant bit positions.

ALU 218 AND INSTRUCTION SET

ALU 218 can be programmed to perform a variety of general and special purpose arithmetic, data movement and logical operations on digital signal words. ALU 218 employs conventional zero-overhead saturation arithmetic for handling computational overflow. ALU 218 can shift double precision signals left or right for the purposes of normalization. And, instructions exist for performing unsigned arithmetic operations without saturation.

During every microinstruction cycle, ALU 218 takes one or two 24-bit operands and produces a 24-bit result. The execution of ALU 218 overlaps with the operation of MAC/BS 220, so the two units operate in parallel.

Instructions

The instructions executed by ALU 218 are three operand instructions of the form:

OPERATION A,B>C.

The source A and B operands can be any location in GPR 224, AOR 226 or any SPR. The C operand is the destination and it also can be any location in GPR 224, AOR 226 or any SPR. Since the external memory interface, as described in detail below, takes place via SPRs (DILs and DOLs) 228, the available operands can also be taken from external memory. Some of the instructions for ALU 218, especially program control instructions, do not use all three operands. Some of the ALU instructions (e.g., AVG) are functionally illustrated in the figures which show a decoder means for decoding that particular instruction from the opcode field of the microinstruction word. The control signals generated by the decoder means are used to dictate the datapath taken by the operand(s) as it is processed. Once the opcode for the instruction is decoded, the datapath control (e.g., how data gets from an adder to a shifter), as is appreciated by those skilled in the art, can be accomplished using, for example, multiplexers.

It should be noted that the mnemonic ZERO used below refers to a read-only SPR having a preset value of zero.

ADD is a saturating 2's complement addition operator used to create the sum of two signals. If the sum cannot be represented in 24 bits, the full-scale positive value (h7fffff) or the full-scale negative value (h800000) is substituted for the overflowed result. The operation performed is C=A+B.

ADDV is an unsaturating addition operator. It operates exactly as ADD, except that it does not perform overflow detection/saturation. For this reason, it is not normally used to add signals together, unless the signals are double precision. However, it can be used for generating ramp signals and for performing unsigned address arithmetic. It performs the operation C=A+B modulo $2^{24}$.

ADDC is a saturating 2's complement addition operator like ADD, but the carry bit in the condition code register (CCR) is added at the LSB. This is valuable for double precision arithmetic. The operation performed is C=A+B+carry.

When the ADDC instruction is used in conjunction with a preceding ADDV to perform double precision arithmetic, the ADDC operation can saturate the high 24-bit word of the 48-bit result. Since the low 24-bit word was computed in the preceding ADDV operation, its value is not saturated.

AMDF subtracts the operands as B−A with saturation and then takes the absolute value of the result as represented by $if (B−A)<0$ then $C=(B−A)$ xor $hffffff$ else $C=B−A$ AND performs the bit-wise logical AND of each bit in the two 24-bit operands: C=A*B.

AS (arithmetic shift) performs an arithmetic shift of B by the contents of A. Saturation occurs if any of the bits shifted through the MSB differ from the original sign bit. The shift amount is restricted to the range of +8 to −8. Positive values correspond to left (MSB) shifts and negative values correspond to right (LSB) shifts. Zeros enter the LSB during left shifts and the sign bit is copied into the vacated MSBs during right shifts.

ASDH (Arithmetic Shift Double High) performs a double precision arithmetic shift with B being the high word and A being the low word of a 48-bit input word. Saturation occurs if any of the bits shifted through the MSB differ from the original sign bit. The shift amount for this operation comes from the ALU_SHIFT SPR and is restricted to the range of +8 and −8 as in the AS and LS instructions. Zeros enter at the low-word LSB in a left shift, and the sign bit is copied into the vacated high-word MSB in a right shift. The result is the high 24-bit word of the 48-bit shift output.

ASDL (Arithmetic Shift Double Low) performs a double precision arithmetic shift with B being the high word and A being the low word of a 48-bit input word. The shift amount for this operation comes from the ALU_SHIFT SPR and is restricted to the range of +8 and −8 as in the AS and LS instructions. Zeros enter at the low-word LSB in a left shift and the sign enters at the high-word MSB in a right shift. The result is the low 24-bit word of the 48-bit shift output.

Figure 4:
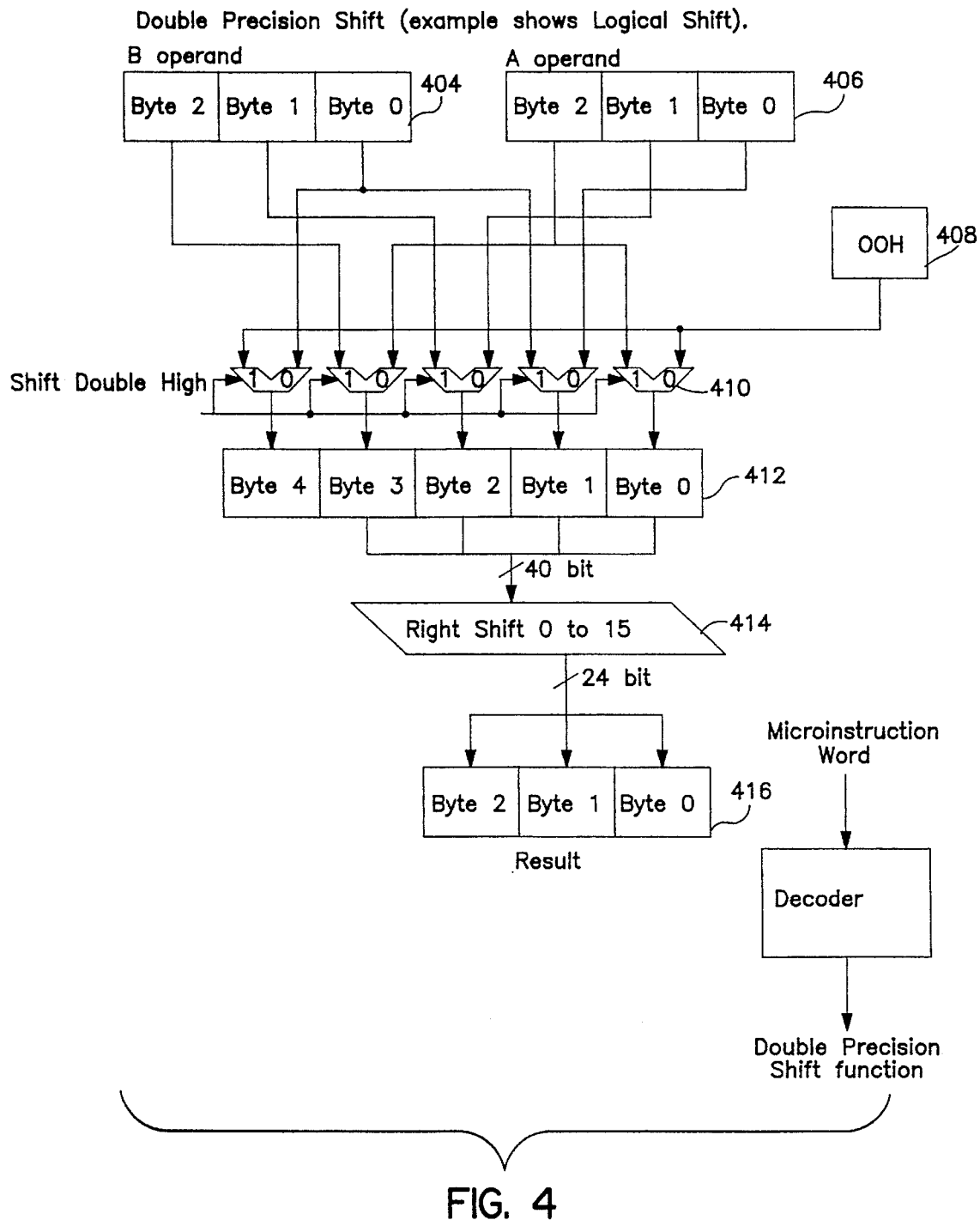
FIG. 4 is a functional block diagram illustrating how a double precision shift instruction is performed by the ALU of FIG. 2.

FIG. 4 shows a functional block diagram illustrating how a double precision shift, particularly an arithmetic double precision shift, operates in ALU 18. As shown, either the three bytes of the B operand 404 or the three bytes of the A operand 406 are primarily used to construct an intermediate operand 412 which is input to shifter 414. The selection is determined via the Shift Double High signal which, if it is a "1" (indicating high), selects the three bytes in B 404, and if it is "0" (indicating low), selects the three bytes in A 406. If "B" is selected the resulting 40 bit-input to shifter 414 includes the MS byte of "A" appended as the LS byte, and if "A" is selected the resulting 40-bit input includes a byte of "0"s appended as its LS byte and the LS byte of "B" appended as its MS byte.

Again, ALU 18 performs the ASDH and ASDL instructions by intelligently extracting a 24-bit field from the 48-bit input based on shift direction and whether the low or high word is desired. When the low word is desired, the MSBs of the input are lost before the shift and are therefore not available for detecting overflow during a shift.

It should be noted that the result of this instruction overflows to hFFFFFF or h000000 when a left shift is performed and the V flag in the CCR is true from the previous instruction. The direction of overflow is determined by the N flag of the CCR from the previous instruction. The N and Z flags are set based on the 24-bit result from this instruction, the V flag is not modified.

AVG performs an average calculation of two operands, C=(A+B)>>1. The guard bit of the addition result is included in the shift. This means that two full scale signals may be used as inputs.

NOTE: The operation (A−B)/2 can be coded using the AVG instruction as follows:

AVG somereg_a, somereg_b>somereg_c
SUB somereg_b, somereg_c>some_other_reg

This method avoids the possibility of saturation in the intermediate result that could occur if coded as follows:

SUB somereg_b, somereg_a>somereg_c
AS #−1, somereg_c>some_other_reg

Figure 5:
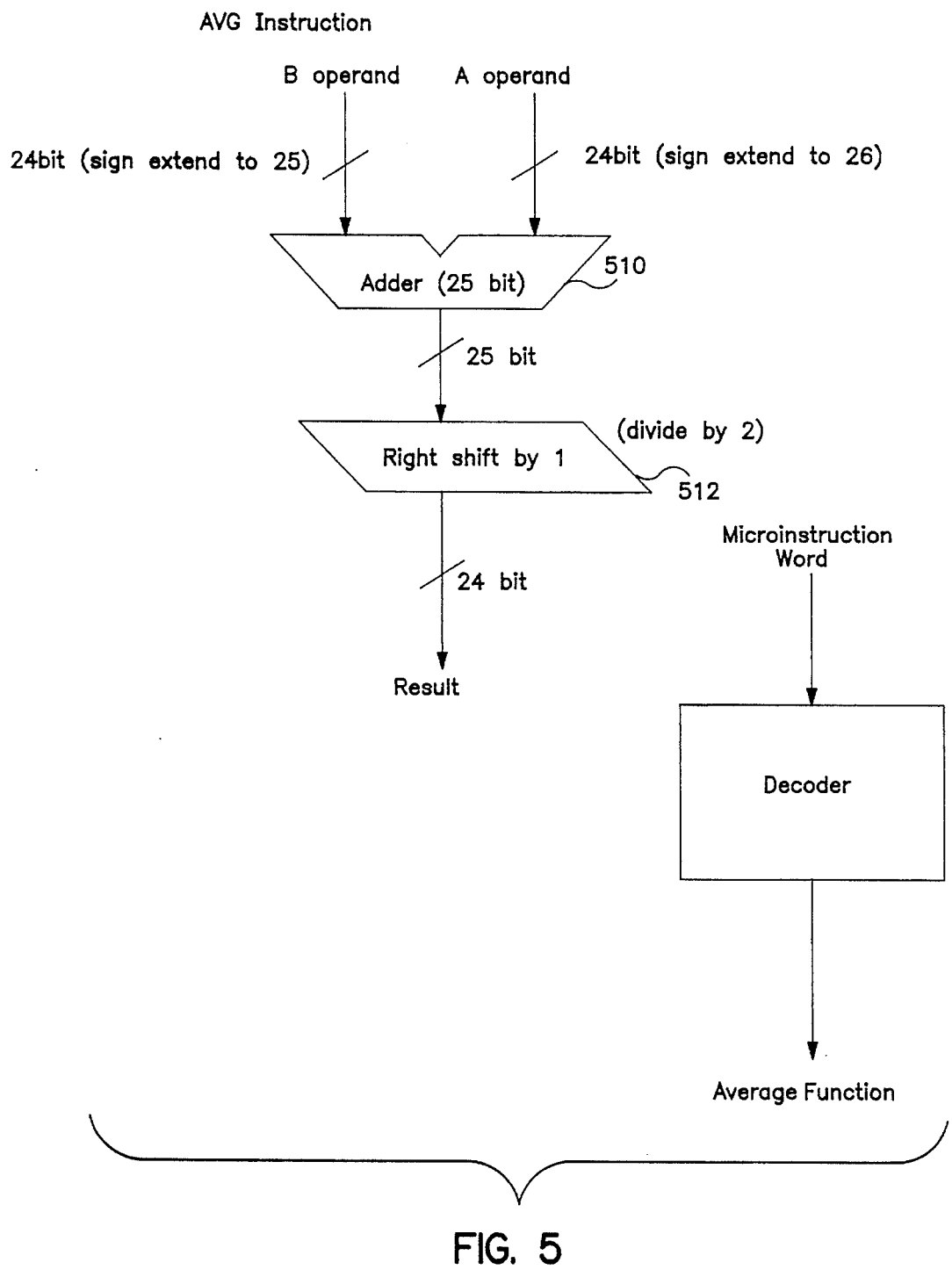
FIG. 5 is a functional block diagram illustrating how an average (AVG) instruction is performed by the ALU in FIG. 2.

FIG. 5 shows a functional block diagram of how the AVG instruction is implemented in ALU 18. As shown, the A and B operands are added by adder 510 then the result is shifted right by 1 by shifter 512 in order to perform the divide-by-2 in a single microinstruction cycle.

BIOZ is a synchronization instruction which sets the BIOZ bit in the HOST_CNTL interface register which is an SPR. A high BIOZ bit suspends the operation of the chip if the IOZ status bit of the HOST_CNTL, register is low. The chip remains suspended until the IOZ status bit is set. Execution then resumes and the IOZ status bit and the BIOZ bit are automatically cleared. The IOZ status bit is set by a low to high transition of the IOZ pin while the IOZ_EN bit in the HOST_CNTL register is high. The IOZ pin is an asynchronous input which is synchronized in the microinstruction cycle.

Taking the IOZ_EN bit low disables the setting of the IOZ status bit and, therefore, holds the chip in a BIOZ state indefinitely assuming that a BIOZ instruction was encountered in the microprogram. Otherwise, when IOZ_EN is again set high, the next low to high transition on the IOZ pin sets the IOZ status bit. If IOZ_EN goes low after the IOZ status bit was set, the BIOZ instruction still observes a high IOZ status bit. This is functionally illustrated in FIG. 6a.

Figure 6A:
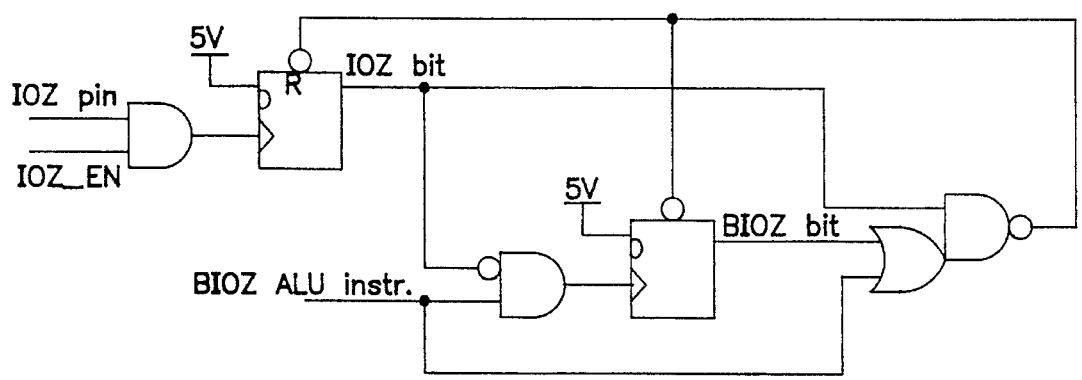
FIG. 6a is a functional block diagram illustrating an aspect of a BIOZ instruction as performed by the ALU of FIG. 2.
Figure 6B:
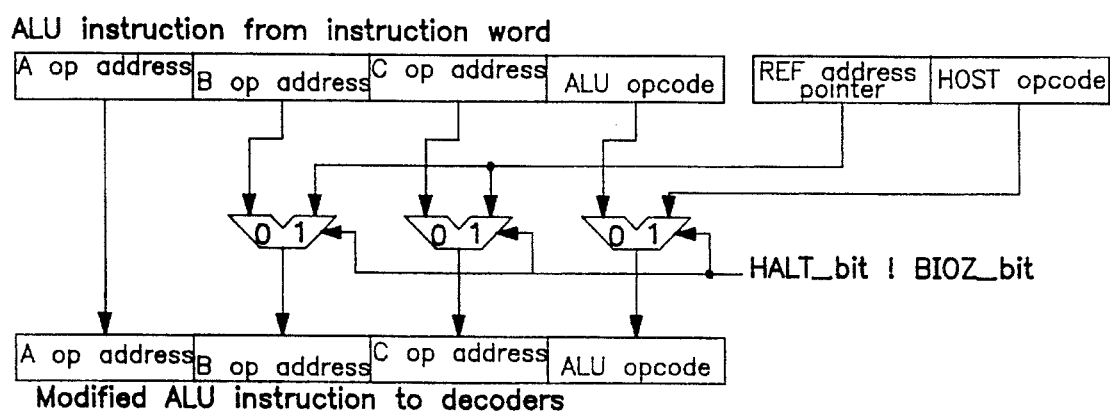
FIG. 6b is a functional block diagram illustrating activity in the operand datapath during a BIOZ instruction as performed by the ALU of FIG. 2.
Figure 7:
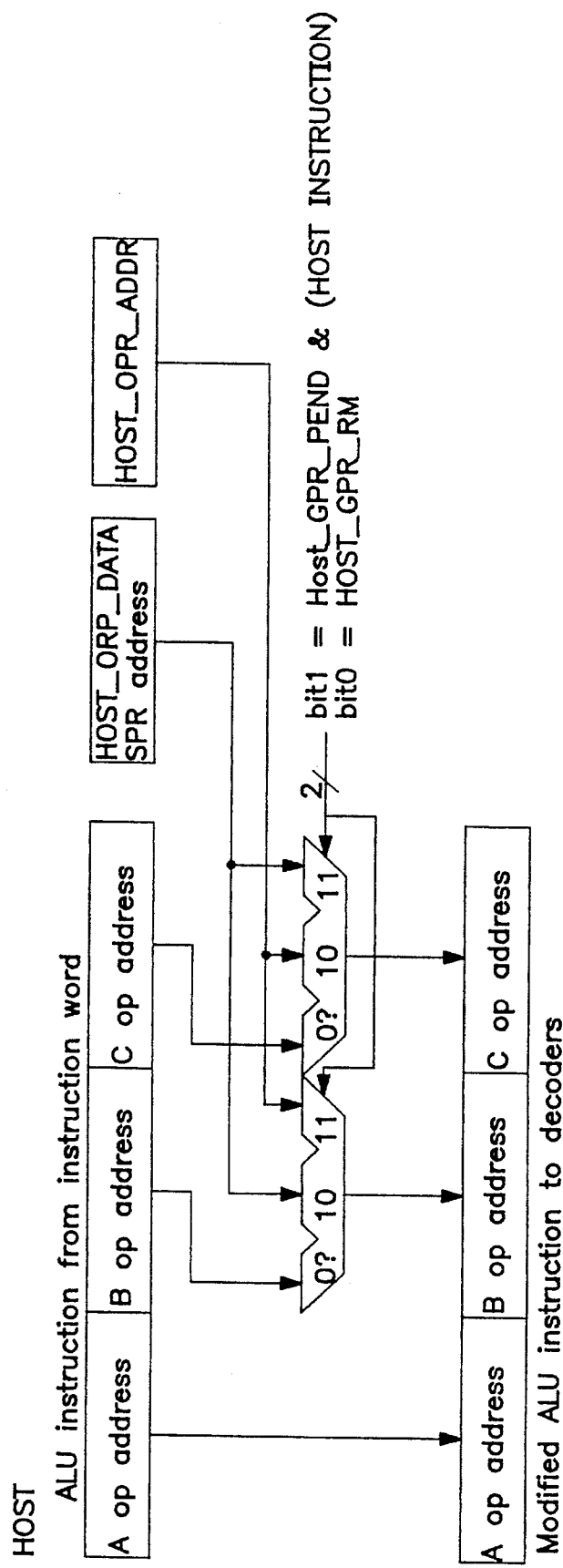
FIG. 7 is a functional block diagram illustrating activity in the operand datapath during a HOST instruction as performed by the ALU of FIG. 2.

The BIOZ instruction itself executes as a MOV in the ALU moving the register addressed by the Bop address to the register addressed by the Cop address. This instruction also causes synchronization to an external sample rate clock by suspending execution pending a low to high transition of the IOZ input pin, if one has not occurred prior to execution of the BIOZ instruction. This program suspension occurs when the BIOZ_bit is high. A block diagram of the associated logic is shown in FIG. 6b (which is the same mechanism used to halt the chip via the HALT pins of the HOST_CNTL register). In FIG. 6b, if either the HALT_bit or the BIOZ_bit is asserted, the REF address pointer replaces the B and C operand addresses and the HOST opcode replaces the ALU opcode. In order to allow run time host interaction, the ALU executes HOST instructions while suspended.

It should be noted that the IOZ bit appears in the CCR, the HOST_CNTL interface register, and the HOST_CNTL_ SPR. BIOZ monitors the bit which appears in CCR. Unlike the IFLAG pin, an image of the IOZ pin does not exist.

```
Equivalent
Pseudocode:   MOV REF > REF /* BIOZ bit is clear coming in.*/
              /* These B and C operands are supplied by the
              assembler */ if (IOZ bit) /* set on Low to High
              transition of IOZ pin */
                  clear IOZ bit
              else
                  set BIOZ bit
              execute < next ALU instr. > /* latency */
              if (IOZ bit)
              {
                  clear BIOZ bit
                  clear IOZ bit /* zero it for detection
                                  of next sample period */
              }
              while (BIOZ bit)
              {
                  HOST /* auto refresh and host interaction */
                  /* B and C operands above are supplied by the
                  hardware as REF */ if (IOZ) bit /* set on Low
```

```
       to High transition of IOZ pin
       {
       clear BIOZ bit
       clear IOZ bit /* zero for detection of
                       start of next sample period */
       }
   }
   execute < 2nd ALU instr. > /* resume microprogram */
```

BREV performs a bit reverse operation on the full 24 bits of the B operand. The MSB becomes the LSB and vice versa. This instruction is used in a radix 2 FFT and can be used for FFTs of any binary size.

DREV performs a digit reverse operation on the full 24 bits of the B operand. The operation on the bits is as follows:

```
                    23 > 1
                    22 > 0
                      :
                      :
                     1 > 23
                     0 > 22
```

This instruction is used in a radix 4 FFT; it can be used in any FFT of quaternary size.

HOST provides host access to locations within GPR 224, AOR 226 and any SPR via the HOST interface registers. A HOST_GPR_PEND bit of the HOST_GPR_CNTL register is checked for a pending host access. If an access is pending, a MOV instruction is automatically executed which moves data between the HOST_GPR_B_SPR register and internal memory in the direction specified by the HOST_GPR_RW\ bit of the HOST_GPR_CNTL register. The address of the GPR 224, AOR 226 and/or SPR register to be accessed resides in the HOST_GPR_ADDR registers. If no access is pending a MOV of B to C automatically occurs. This is functionally illustrated in FIG. 7 which shows that the host data (HOST_GPR_DATA) and the host address (HOST_GPR_ADDR) replace the B operand address and the C operand address which gives the host access to any data storage location in the chip.

Jcc (Jump on condition code) moves the value in the B operand field of the instruction into the program counter (PC). The A operand field of the instruction holds a condition mask which controls conditional execution of the instruction by preloading the Condition Mask Register (CMR).

Because there is a one cycle latency before PC is modified, the instruction following the Jcc is executed before the jump occurs. Conditional execution applies to all instructions. Conditional jumps are performed by conditionally executing the Jcc instruction. If the skip bit is not set for ALU 218, the jump is taken regardless of the preloaded mask. The "cc" can be a condition based on GT, GTE, EQ, LT etc.

JScc (Jump Subroutine on condition code) functions similar to Jcc, however, the current value of PC is pushed onto a stack. The B operand field holds the new value of PC, while the A operand field holds a preload condition mask. As with Jcc, the instruction after a JScc is executed before the subroutine is entered.

Figure 8:
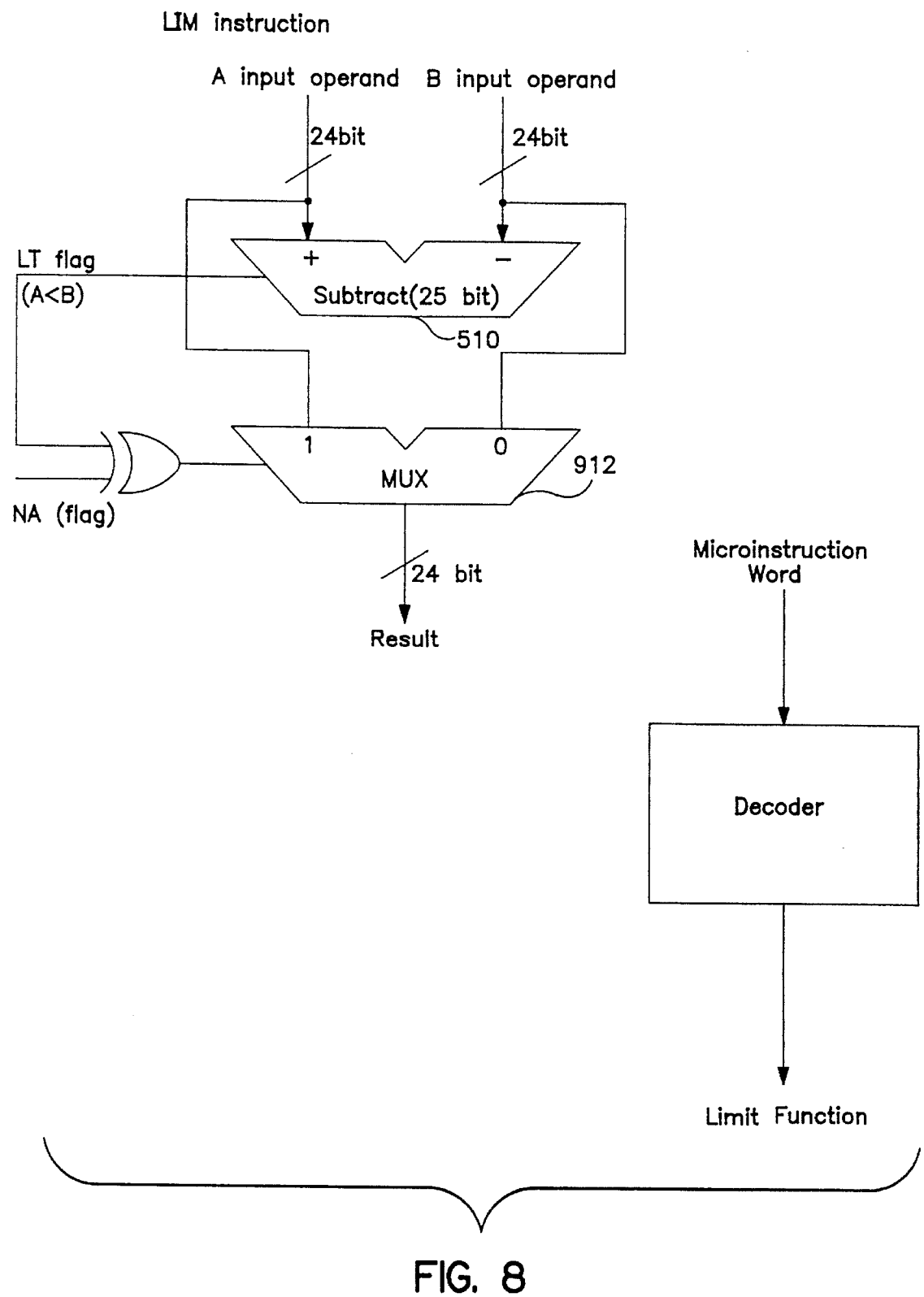
FIG. 8 is a functional block diagram illustrating how a limit (LIM) instruction is performed by the ALU of FIG. 2.

LIM (Limit) is a special operation for checking a ramping value against an upper or lower limit. As illustrated in FIG. 8, the LIM instruction accepts a limit value as the A operand and a ramping value as the B operand and these operands are compared by subtracter 510 (same arithmetic unit used for AVG instruction). The instruction also looks at the NA condition flag from the previous ALU operation to determine the ramp direction. Based on the comparison and the NA flag, either the A operand or the B operand is selected by MUX 912.

The instruction executes as follows:

```
              if (NA == 0)
                  MIN A,B > C
              else
                  MAX A,B > C
```

In the exemplary embodiment of the present invention, the instruction is typically used in a two instruction block as follows:

ADD increment, current_value>current_value
LIM limit, current_value> current_value The ADD instruction sets the NA flag with the sign of the increment which indicates the direction of the ramp.

It should be noted that since skippable instructions do not modify the condition codes, the above LIM instruction does not work properly if the preceding ADD instruction is designated as "skippable".

LS (Logical Shift) performs a logical shift of the contents of B by the contents of A. The shift amount is restricted to the range of +8 to −8. Zero will be shifted into the LSB or MSB depending on the direction of shift. No sign extension or saturation occurs.

LSDH (Logical Shift Double High) performs a double precision logical shift with B being the high word (MSBs) and A being the low word (LSBs) of a 48-bit input word. The shift amount for this operation comes from the ALU_SHIFT SPR and is restricted to the range of +8 and −8. Zeros enter vacated bits in left and right shifts of the 48-bit double word. The result is the high 24-bit word of the 48-bit unsaturated shift output.

LSDL (Logical Shift Double Low) performs a double precision logical shift with B being the high word and A being the low word of a 48-bit input word. The shift amount for this operation comes from the ALU_SHIFT SPR and is restricted to the range of +8 and −8. Zeros enter vacated bits in left and right shifts of the 48-bit double word. The result is the low 24-bit word of the 48-bit unsaturated shift output.

Both the LSDH and LSDL are performed in a similar manner as the ASDH and ASDL, as described with reference to FIG. 5. AS noted above, however, there is no sign extension with LSDH and LSDL, also there is no saturation.

MAX (Maximum) takes the arithmetically GREATER in two's complement of the A and B operands, and provides it as C as represented by C=MAX(A,B). The comparison is performed as C=A−B.

MIN (Minimum) takes the arithmetically LESSER in two's complement of the A and B operands, and provides it as C as represented by C=MIN(A,B). The comparison is performed as C=A−B.

MOV (Move register contents) performs the basic data movement operation, MOVE the contents of the location addressed by B to C.

MOVcc (Move on condition code) functions like MOV however the A operand field holds a preload condition mask, which is sent to the CMR. If this instruction is marked as skippable, then "cc" is used to determine the conditional execution of this instruction.

OR performs the bit-wise logical OR of each bit in the two 24-bit operands: C=A v B.

RECT (rectify) performs the operation.

```
if B < 0
    C = A – B (with saturation)
else
    C = B
```

Two special cases of this instruction exist: If A=0 the result is the absolute value of B (full wave rectification). If A=B the result is B if B is positive or 0 if B is negative (half wave rectification).

REPT provides a low overhead looping mechanism, by which the instruction fetch unit repeats a block of instructions a specified number of times. The A operand field holds the value of the last instruction of the block which is placed in REPT_END. The B operand field is the number of times to repeat the block which is placed in REPT_CNT. The REPT command functions such that the block is executed at least once. The pseudo-code representation is as follows:

```
REPT_CNT = init;
do (
    - - - - - -
    - - - - - -
    lastline: - -
)
while (REPT_CNT- -);
```

Three SPRs are used in the loop mechanism. As mentioned, the REPT instruction loads the value in the A operand field into REPT_END. REPT loads the value of the B operand field into the REPT_CNT, and it loads the value of PC for the next microinstruction into the REPT_ST register. A non-zero positive value for REPT_CNT causes a jump to REPT_ST to repeat the block when the instruction on line number contained in the REPT_END is executed. REPT_CNT decrements at the end of each pass through the block.

The hardware for setting up a loop is separate from the normal ALU data path. The normal data path during this instruction executes a MOV B>C. To make this a benign operation, the C operand can be the ZERO register. The instruction would have the following form:

first_form: REPT last_instruction, count>ZERO

Since the normal ALU datapath movement occurs after the REPT_CNT is loaded from B operand field, the ALU datapath MOV operation could be used to move a count value from the contents of a chip register into the REPT_CNT. The form of the instruction would be second_form: REPT last_instruction, count_gpr>REPT_CNT.

In this case, count_gpr is a GPR containing a count amount. So the sequence of events moves the address of count_gpr into REPT_CNT via B operand field. At a later time, the contents of count_gpr are moved to REPT_CNT via the ALU datapath. Because of the pipeline latency involved, REPT_CNT 1016 does not get the contents of count_gpr for two instruction cycles. This is acceptable if the repeated block is at least two instructions long. This second use of the REPT instruction allows counts greater than and allows calculated loop counts. The difference is that the first form uses 10-bits of the micro instruction word to hold the count while the second form employs a 24-bit GPR instead.

If the repeated block is only 1 instruction in length, the loop executes correctly if and only if the address of count_gpr is nonzero, and the contents of count_gpr is the number of repeats minus one.

It should be noted that jumps and subroutines are allowed within a loop, however, these instructions should not immediately precede the last instruction of the repeated block. A programmer should be careful when a jump instruction is intended to abort the execution of the loop. The loop counter mechanism is still functional as long as REPT_CNT is positive, and will attempt to continue the loop if the last instruction is reached by any means. So to be safe, zero REPT_CNT by executing the EXIT pseudo-instruction. In the exemplary embodiment there is only one set of REPT registers, therefore, multiple REPT instructions should not be nested.

Since these registers are SPRs, it is possible to set up loops under program control by writing directly into these registers. If it is necessary to terminate a loop at the end of the current block, this can be done by setting the REPT_CNT to zero via an ALU 218 or MAC/BS 220 pseudo-instruction. Because of pipeline latencies, an EXIT should occur at least one instruction before the last instruction of the loop in order for the loop to stop at the end of the current block.

It should be noted that since REPT_CNT, REPT_END, and REPT_ST are updated as a result of REPT execution, an error can occur if these registers are used as the destination of a MAC/BS 220 operation occurring in the same instruction as a REPT or the last line of a repeated block.

RScc (Return to Subroutine on condition code) pops the value of PC from the stack. The A operand field of the instruction holds a preload condition mask. Since RScc modifies the PC, the same as Jcc and JScc, the instruction following the RScc executes as the last instruction of the subroutine.

SUB (Subtract) is a 2's complement saturating subtraction operator which yields the difference of two signals, analogous to ADD. It performs the operation C=B–A.

SUBB (Subtract carry-in) is a 2's complement saturating subtraction operator which yields the difference of two signals. It differs from SUB in that the carry bit of the CCR is subtracted from the LSB position. This operator is useful for double precision arithmetic. It performs the operation C=B–A–carry.

When the SUBB instruction is used in conjunction with a preceding SUBV to perform double prevision arithmetic, the SUBB operation can saturate the high 24-bit word of the 48-bit result. Since the low 24-bit word was computed in the preceding SUBV operation, its value will not be saturated. The low word of the result can be adjusted by the following conditional operation:

```
SUBV a_low,b_low > c_low
SUBB a_high,b_high > c_high
IF OV
    XOR h8000000,c_high > c_low
```

SUBREV is a 2's complement saturating subtraction operator which yields the difference of two signals, just like SUB. However the position of the source operands with respect to the minus sign is reversed. It performs the operation C=A–B. The statement SUBREV A,B>C is read "compare A to B and set the conditions accordingly".

SUBV is an unsaturated subtraction operator, analogous to ADDV. Like SUB, it performs the operation C=B–A.

XOR performs the bit-wise logical EXCLUSIVE OR of each bit in the two 24-bit operands: C=A v B.

Setting Condition Codes

Only ALU 218 instructions set the bits of the CCR register. CCR bits become valid at the end of a complete ALU instruction cycle; thus, they are available for reading by the next ALU 218 operation and the second MAC/BS 220 operation. CCR bits are active for the conditional execution of ALU 218, MAC/BS 220, and/or AGEN 216 operations during the next microinstruction cycle.

If the ALU 218 instruction is marked as skippable, the condition codes remain unchanged from the previous instruction. Condition codes are computed as shown below in Table III for each ALU 218 operation:

TABLE III

| OPERATION | NB | NA | N | C | V | LT | z |
|---|---|---|---|---|---|---|---|
| ADD,ADDV,ADDC | X | X | X | X | X | X | X |
| SUB,SUBV,SUBB SUBREV | X | X | X | X | X | X | X |
| AND,OR,XOR | X | X | X | — | — | — | X |
| MIN,MAX | X | X | X | X | X | X | (3) |
| AVG | X | X | X | — | X | — | X |
| RECT | X | X | X | — | (2) | (2) | X |
| AMDF | X | X | (4) | X | X | X | X |
| AS,ASDH | X | X | X | (1) | X | — | X |
| ASDL | X | X | X | (1) | — | — | X |
| LS, LSDH,LSDL | X | X | X | (1) | — | — | X |
| BREV | X | X | X | — | — | — | X |
| DREV | X | X | X | — | — | — | X |
| LIM | — | — | X | X | X | X | (3) |
| MOV | — | — | — | — | — | — | — |
| HOST,BIOZ,REPT | — | — | — | — | — | — | — |
| Jcc,JScc,RScc,MOVcc | — | — | — | — | — | — | — |

Regarding Table III, an X in the NB and NA flags indicates that the flag is set to the sign of the corresponding input operand, two's complement. An X in the N flag indicates that the flag is see to the sign of the result of the operation, 2's complement. An X in the C flag indicates that the flag is set to the value of the carry output of the MSB of the adder/subtractor. An X in the V flag is set to the value G XOR N' where G is the guard bit of the adder/subtractor, and N' is the MSB of the adder/subtractor output prior to saturation. An X in the LT flag indicates that the flag is set to the value N'XOR V. An X in the Z flag indicates that the flag is set to a 1 if the result of the operation is a zero.

A (—) indicates that this flag is not altered by the operation.

A (1) indicates that C receives the last bit shifted off the left of the 24-bit result in a left shift or off the right of the 24-bit result in a right shift (before saturation is performed in the cases of arithmetic shifts;

If the shift amount is zero the C flag gets the bit immediately to the left of the MSB: In the case of AS or ASDH, this would be a sign extend of the MSB. In the case of LS or LSDH this would be zero. In the case of ASDL or LSDL, this is the LSB of the B operand.

A (2) indicates that V and LT are modified based on the result of the subtraction if the B operand is less than zero. If the B operand is greater than or equal to zero, the subtraction is not performed, therefore the V and LT flags will be cleared.

A (3) indicates that Z is asserted based on the result of the comparison not the result of the instruction.

A (4) indicates that the result of an AMDF operation always has a positive sign. Therefore, the N flag for this operation is set based on the sign of the subtraction result, which is indicative of whether the 1's complement operation was performed.

Conditional Execution

In addition to the program control instructions previously specified (e.g., Jcc), a mechanism that allows individual steps of its microcode to be conditionally executed is also provided. Any microinstruction step may be flagged by a programmer as "skippable", this is accomplished via the microinstruction fields designated SKIP BITS. This means that the instruction is only executed when the CCR is in a certain state. This state constitutes the skip condition, and is specified by loading a particular bit pattern into the Condition Mask Register (CMR).

By loading various values into the CMR, the instructions of the functional units (i.e., MAC/BS 220, ALU 218 or AGEN 216) can be conditionally executed according to a variety of different conditions. The conditions result from combinations of the nine basic CCR flags IOZ, IOZ, IFLG, NB, NA, N, Z, C, V and LT.

When the CMR and CCR do not correspond, an instruction having its skip-bit set executes, but the write to the destination address or register is inhibited. It should be noted that ALU 218, MAC/BS 220, and AGEN 216 have their own skip bits so this mechanism can be applied independently to each.

In the exemplary embodiment, instructions which are skippable do not set the condition codes, regardless of whether they were executed or not. This restriction allows the CMR to be initialized and a condition (CCR) tested at the beginning of a block of skippable instructions, with the condition being held the same across the entire length of the block. It should be noted that if a block of MAC/BS 220 or AGEN 216 instructions is marked as skippable while the corresponding block of ALU 218 instructions is not, the CCR (condition) may change for each instruction.

To detect a Skip condition during the instruction cycle of any skippable instruction step, the following logical computation is performed:

$$\text{Skip} \backslash = NOT_m \, XOR \, ((NB*NB_m) + (NA*NA_m) + (N*N_m) +$$
$$(Z*Z_m) + (V*V_m) + (C*C_m) + (LT*LT_m) +$$
$$(IFLG_m*IFLG_m) + (IOZ*IOZ_m))$$

The subscript m in the above equation indicates the corresponding bit of the CMR. Each mask bit in the CMR (except NOT) is ANDed with the corresponding bit in the CCR, and the results are OR'ed together. This result is then conditionally inverted according to the status of the NOT bit to account for the extra negated cases. If the final result is FALSE (equal to a logical "0") then the current instruction step is skipped; that is, the step becomes a NOP for MAC/BS 220 and AGEN 216 and a NORFSH for ALU 218 by disabling the output of any results.

Note that an "execute never" condition, where instructions are unconditionally skipped, can be effected by clearing all CMR bits to 0 except for a 1 in the NOT bit. Likewise, "execute always" can be accomplished by clearing all bits in the CMR including NOT.

Instructions Not Skippable

Blocks of skippable ALU 218 instructions warrant consideration regarding the impact on the execution of several instructions (such as ADDC, SUBB, LIM, ASDL) which use CCR bits as part of their computation. It should be noted that double precision operations are impacted, and programmer should consider the use of branching instructions instead of skippable instructions.

Arithmetic Condition Masking

There are 16 commonly used arithmetic conditions which can be tested based on 5 CCR flags: N, C, V, LT, and Z. A mask is loaded with 5 corresponding bits and a NOT bit into the CMR to select the condition which will cause instructions to be executed. The mask values for the 16 conditions are listed below in Table IV.

TABLE IV

Arithmetic Condition Code Masks

| Condition | Mnemonic | NOT | IOZ | IFLG | NB | NA | N | C | V | LT | Z | Mask Value |
|---|---|---|---|---|---|---|---|---|---|---|---|---|
| Equal (Zero) | EQ=Z | 1 | 0 | 0 | 0 | 0 | 0 | 0 | 0 | 0 | 1 | h201 |
| Not Equal | NEQ | 0 | 0 | 0 | 0 | 0 | 0 | 0 | 0 | 0 | 1 | h001 |
| Negative | NEG | 1 | 0 | 0 | 0 | 0 | 1 | 0 | 0 | 0 | 0 | h210 |
| Positive (>=0) | POS | 0 | 0 | 0 | 0 | 0 | 1 | 0 | 0 | 0 | 0 | h010 |
| Overflow Set | OV | 1 | 0 | 0 | 0 | 0 | 0 | 0 | 1 | 0 | 0 | h204 |
| Overflow Clear | NV | 0 | 0 | 0 | 0 | 0 | 0 | 0 | 1 | 0 | 0 | h004 |
| Lower than (carry set) | LO=CS | 1 | 0 | 0 | 0 | 0 | 0 | 1 | 0 | 0 | 0 | h208 |
| Higher or same (carry clear) | HS=CC | 0 | 0 | 0 | 0 | 0 | 0 | 1 | 0 | 0 | 0 | h008 |
| Lower or same | LS | 1 | 0 | 0 | 0 | 0 | 0 | 1 | 0 | 0 | 1 | h209 |
| Higher than | HI | 0 | 0 | 0 | 0 | 0 | 0 | 1 | 0 | 0 | 1 | h009 |
| Less than | LT | 1 | 0 | 0 | 0 | 0 | 0 | 0 | 0 | 1 | 0 | h202 |
| Greater or equal | GTE | 0 | 0 | 0 | 0 | 0 | 0 | 0 | 0 | 1 | 0 | h002 |
| Less or equal | LTE | 1 | 0 | 0 | 0 | 0 | 0 | 0 | 0 | 1 | 1 | h203 |
| Greater than | GT | 0 | 0 | 0 | 0 | 0 | 0 | 0 | 0 | 1 | 1 | h003 |
| Always | ALW | 0 | 0 | 0 | 0 | 0 | 0 | 0 | 0 | 0 | 0 | h000 |
| Never | NEV | 1 | 0 | 0 | 0 | 0 | 0 | 0 | 0 | 0 | 0 | h200 |
| IFLG flag set | IFLG | 1 | 0 | 1 | 0 | 0 | 0 | 0 | 0 | 0 | 0 | h280 |
| IFLG flag cleared | NIFLG | 0 | 0 | 1 | 0 | 0 | 0 | 0 | 0 | 0 | 0 | h080 |
| IOZ flag set | IOZ | 1 | 1 | 0 | 0 | 0 | 0 | 0 | 0 | 0 | 0 | h300 |
| IOZ flag cleared | NIOZ | 0 | 1 | 0 | 0 | 0 | 0 | 0 | 0 | 0 | 0 | h100 |
| NB flag set | BNEG | 1 | 0 | 0 | 1 | 0 | 0 | 0 | 0 | 0 | 0 | h240 |
| NB flag cleared | BPOS | 0 | 0 | 0 | 1 | 0 | 0 | 0 | 0 | 0 | 0 | h040 |
| NA flag set | ANEG | 1 | 0 | 0 | 0 | 1 | 0 | 0 | 0 | 0 | 0 | h220 |
| NA flag cleared | APOS | 0 | 0 | 0 | 0 | 1 | 0 | 0 | 0 | 0 | 0 | h020 |

Note that the values are not copies of the bit patterns produced by the CCR when these conditions exist. They are merely mask values that are necessary and sufficient for detecting the condition. In addition to these conditions, the IFLG and IOZ flags can be used for conditional execution based on the state of external signals.

The CMR can be written by a number of means. First, special instructions in ALU 218 (Jcc, JScc, RScc, MOVcc) move the value of the A operand field of the instruction into the CMR. When these insructions are executed, the new condition mask is effective for all operations (MAC/BS 220, ALU 218, and AGEN 216) on the microinstruction line.

A second method for setting the condition mask is to use ALU 218 or MAC/BS 220 to move the contents of a data register, either from GPR 224, AOR 226 or an SPR, into the CMR. Under these circumstances, the new condition mask is effective for all operations on the instruction line following the instruction in which the move was performed.

Instruction Cycle Timing

Figure 9:
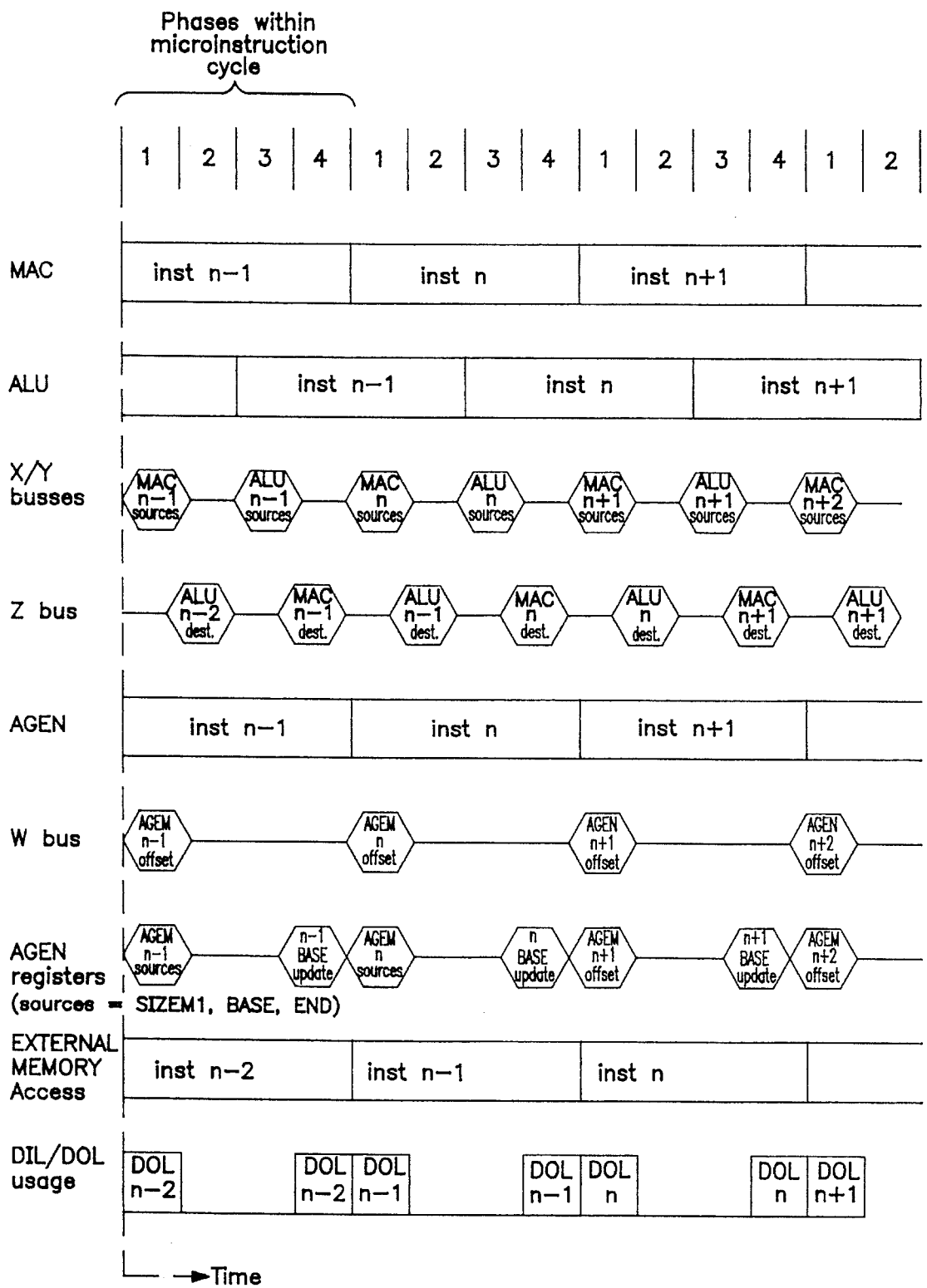
FIG. 9 is a timing diagram illustrating the relative operating relationships of the functional units including external memory/devices in FIG. 2.

All of the microinstructions execute in one instruction cycle. FIG. 9 is a timing diagram which illustrates the instruction execution of each of the functional units along with the operation of the external memory bus. Execution in MAC/BS 220 and ALU 218 are interleaved to allow operand fetches and stores of the operands by multiplexing the X, Y, and Z busses. By operating these busses, for example, at twice the instruction rate, the MAC/BS 220 and ALU 218 can both be supplied with two source operands from the individual data storage areas (GPR 224, AOR 226 or any SPR) and have their results stored back into the data storage areas on each instruction cycle.

The interleaving of MAC/BS 220 and ALU 218 produces some latency of the result of an ALU instruction with respect to a MAC/BS instruction. As illustrated in the timing diagram of FIG. 9, MAC/BS 220 fetches its source operands for instruction "n+1" before ALU 218 has stored its results from instruction "n". It should be noted that MAC/BS 220 fetches its sources for the same instruction at the same time that AGEN 216 fetches its offset. This is the reason for the restriction on operand fetches described above (i.e., operand E should not be sourced by AOR 226).

A second area of latency occurs in AGEN 216 and external memory operation. Here, AGEN 216 computes an address during one instruction and the external memory cycle to that address takes place during the next instruction cycle. This results in the need to schedule external memory reads before the data is needed by either ALU 218 or MAC/BS 220.

Instruction Scheduling Rules

The interleaving of operations for MAC/BS 220 and ALU 218 and the alignment of timing for AGEN 216 and MAC/BS 220, have important ramifications, especially, for programming. The following rules summarize the data latencies between functional units.

Non-latent operations

1. The result of a MAC/BS 220 operation is available for use as an operand by MAC/BS 220 in the next instruction.
2. The result of a MAC/BS 220 operation is available for use as an operand by ALU 218 in the next instruction.
3. The result of a MAC/BS 220 operation written to AOR 226 or an SPR (e.g., AGEN region register) is available to AGEN 216 in the next instruction.
4. The result of an ALU 218 operation is available for use as an operand by ALU 218 in the next instruction.

Latent operations

5. The result of an ALU 218 operation is available for use as an operand by MAC/BS 220 in the second instruction following the ALU instruction.
6. The result of an ALU 218 operation written to an AOR 226 or an SPR (e.g., AGEN region register) is available to AGEN 216 on the second instruction following the ALU 218 instruction.

The scheduling of external memory cycles relative to MAC/BS 220 and ALU 218 operands follow these rules.

Latent Operation
7. The fetch of a data operand from external memory for use by either ALU 218 or MAC/BS 220 should be scheduled at least 2 instruction cycles prior to the instruction which uses the operand.

Non-latent Operation
8. External memory writes of MAC/BS 220 results can be scheduled on the same line as the instruction which generates the data.
9. External memory writes of ALU 218 results should be scheduled no sooner than one cycle after the instruction which generates the data.

Indirect Register Addressing

A mechanism is provided for indirect addressing of register type operands for MAC/BS 220 and ALU 218. Six SPRs (namely, INDIRA, INDIRB, INDIRC, INDIRD, INDIRE, INDIRF and INDIRG) hold operand addresses for the six operands to ALU 218 and MAC/BS 220, and the AOR 226 operand to AGEN 216.

Figure 11:
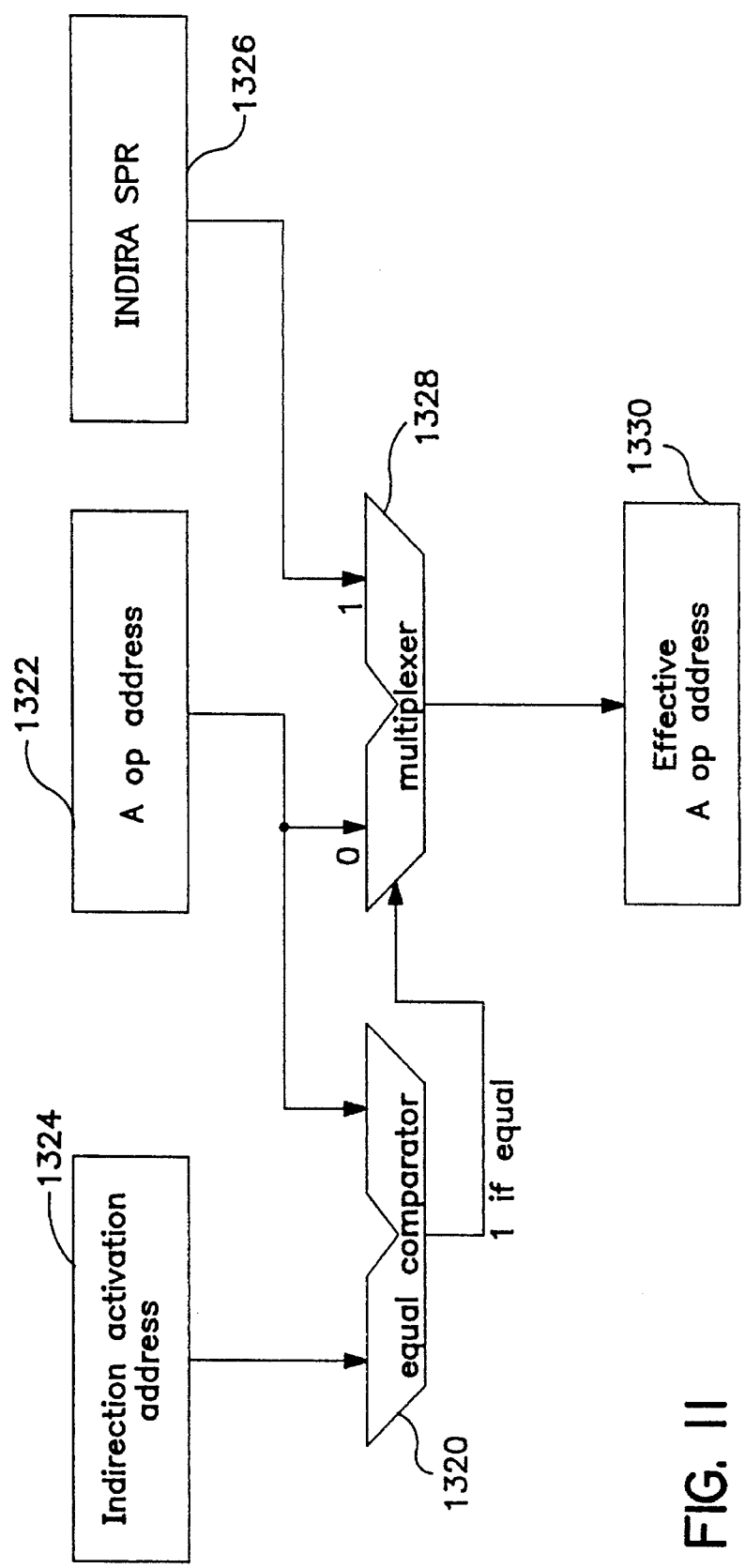
FIG. 11 is a functional block diagram illustrating how one aspect of an indirection mechanism operates.

To activate the indirection mechanism, a register address is placed into one or more of the above-listed SPRs corresponding to the desired operand. The instruction is then written using the INDIRECT SPR address specified in the operand field for which indirection should occur. This can be for any of the seven operands in an instruction. The instruction control circuit in the hardware recognizes this special address and substitutes the contents of the appropriate SPR (INDIRA,B,C,D,E,F,G) for the address. In particular, FIG. 11 illustrates the indirection mechanism for the A operand address which shows comparator 1320 comparing indirection activation 1322 and A operand address 1324 such that the result controls multiplexer 1326 in selecting between the A operand address 1324 and the INDIRCA value 1328 for the "effective" A operand address 1330.

In the exemplary embodiment, the INDIRECT SPR is not a physical register; it is a reserved address which is used to activate indirection on an operand. Two additional reserved addresses INDIRINC and INDIRDEC are provided which also accomplish indirection through the INDIRA,B,C,D,E,F,G registers. INDIRINC has the added functionality of post-incrementing the corresponding INDIRA,B,C,D,E,F,G register's contents. INDIRDEC post-decrements the register's contents. This is very useful in looping on array elements. A programmer can control the increment manually if desired. The incremented address is available in the next microinstruction cycle. If the function units whose operand specified an increment or decrement is skipped for that instruction cycle, the increment or decrement does not occur.

Since ALU 218 instructions REPT, Jcc, JScc, and RScc use the operand address fields of the instruction as immediate fields for holding condition masks and program counter values, the indirection mechanism is disabled in the hardware for these instructions to avoid unexpected results. Such circumstances could occur if one of the operand address fields contains a value which matches the INDIRECT, INDIRINC, or INDIRDEC SPR addresses.

It should be noted that indirection within the REPT repeated block is not prohibited.

Indirect Register Latencies

Since the contents of the INDIRA,B,C,D,E,F,G registers are used as addresses rather than the instruction execution pipeline, the latencies encountered when these registers are modified differ from the latencies described in the previous description of register latencies. The latency rules are as follows:
1. The result of a MAC/BS 220 write to INDIRD,E is available for use as an indirect address two instructions later.
2. The result of a MAC/BS 220 write to INDIRF is available for use as an indirect address one instruction later.
3. The result of an ALU 218 write to INDIRA,B is available for use as an indirect address two instructions later.
4. The result of an ALU 218 write to INDIRC is available for use as an indirect address one instruction later.
5. The result of a MAC/BS 220 write to INDIRA,B,C is available for use as an indirect address two instructions later.
6. The result of an ALU 218 write to INDIRD,E,F is available for use as an indirect address three instructions later.

External Memory Interface

Referring back to FIG. 2, the interface to external memory includes two parts. The first part is AGEN 216 which performs address computations and, the second part is the memory port including an address bus, data bus and control signals which provides the physical connection to external memory. This memory port contains DILs/DOLs 228 which act as the data interface between the internal microprogram and the external memory.

Figure 10:
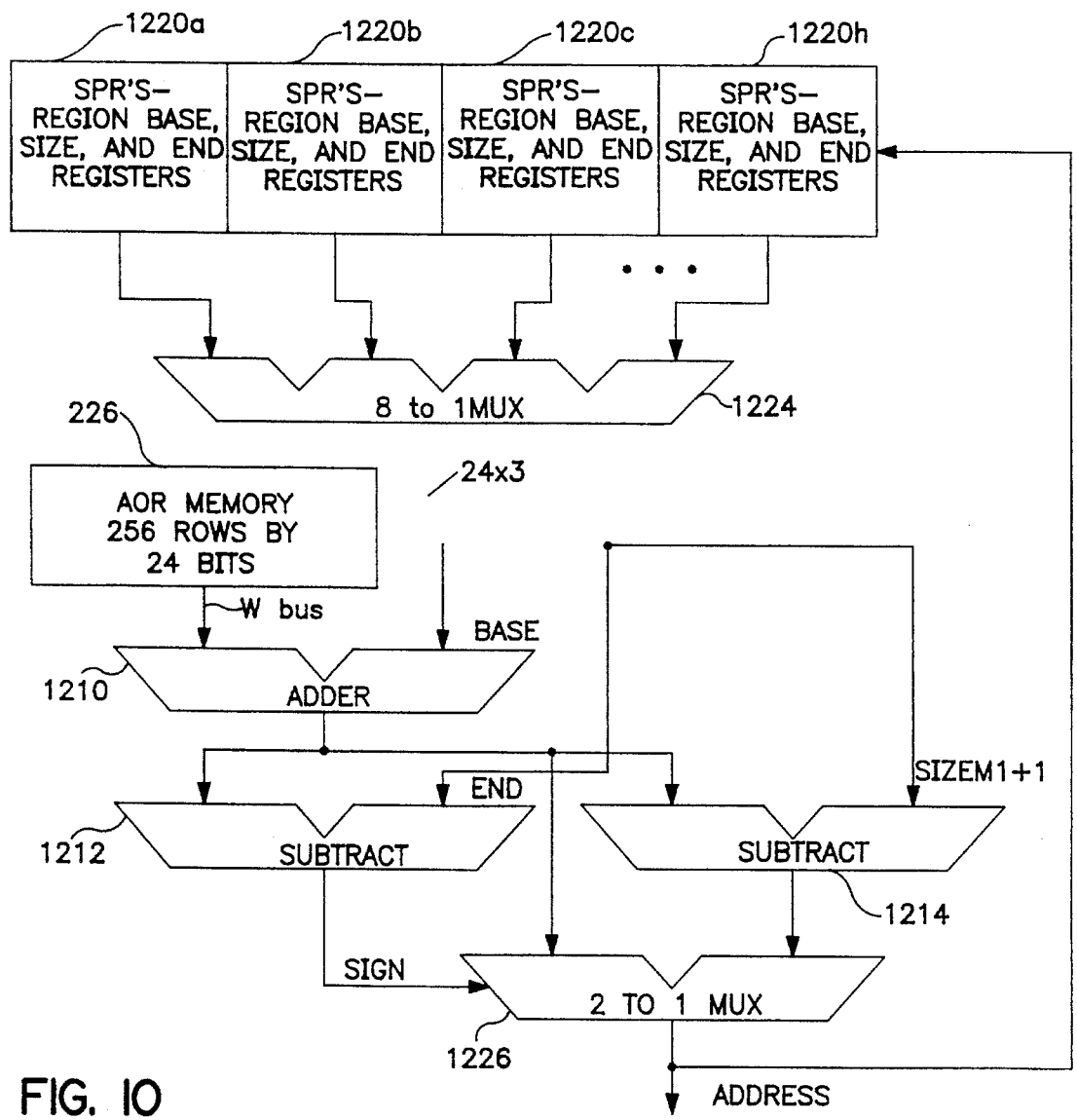
FIG. 10 is a more detailed functional block diagram of the AGEN of FIG. 2.

FIG. 10 shows a detailed functional block diagram of AGEN 216 in FIG. 2. AGEN 216 computes addresses for the external memory interface once every instruction cycle which, in the exemplary embodiment, is 100 ns.

As shown in FIG. 10, AGEN 216 includes three 26-bit adders/subtractors 1210, 1212 and 1214; eight 24-bit BASE registers, eight 24-bit END registers, and eight 24-bit SIZEM1 registers defining eight addressing regions, these register groups are designated 1220a–h, respectively.

One of the register groups 1220a–h is selected via MUX 1224. The constituent BASE, SIZE and END values of the selected register group are added/subtracted with other selected values as shown and, finally, the result of the multiple computations is selected via MUX 1226 as a function of the sign of the output value of adder 1212.

Locations of AOR 226 are selected by the G operand field of the instruction. Three bits in the external memory-control-field of the instruction determine, by controlling MUX 1224, which of the eight regions is accessed. The physical memory location and function of the eight regions are determined by the contents of the region SPRs, BASE, SIZEM1, and END which contain unsigned positive values. These regions can be configured as delay lines, tables, or I/O space by programming the registers appropriately.

AGEN 216 Address Computation

Reverbs in audio processing are typically sparse digital networks (i.e., unit delays are replaced with delay lines whose sizes vary so as to simulate disparate delay times encountered in actual halls). Typically, approximately fifty delay lines are required for a convincing simulation. The inputs of these delay lines are fed by combinations of the outputs of other delay lines, or sometimes by the input signal, or simply another delay line. Each delay line is part of a circular queue defined by this associated region's SIZEM1, END, and BASE Registers. Each delay line is offset from the region base register by a predetermined amount. The AOR's track these offsets. The passage of time is accomplished by decrementing the region base register using an automatic base modulo updating mechanism described below. All the delay line inputs are desirably fed new information, while the old information at the end of each delay line is overwritten by the new information placed into the beginning of the subsequent line.

At every instruction cycle, the following external address calculations, represented by pseudo-code where /*...*/ indicate comments, are performed using the offset and region specifiers indicated in the microinstruction fields.

```
address = AOR + BASE
/* this corresponds to adder 1210 output */
temp = address − END
/* this corresponds to adder 1212 output */
if temp > 0
    /* this corresponds to MUX 1226 select */
    address = address − (SIZEM1 + 1)
    /* this corresponds to MUX 1126 output */
```

SIZEM1 is incremented by 1 because the value of the SIZEM1 register is a value representing a region size −1. This is necessary in order to access a table having the full size of physical memory. The first calculation can also be executed as

*address=AOR+BASE+1* under instruction control. This is useful in acquiring neighboring addresses, as for example, for linear interpolation operations. Although the BASE and END registers are 24-bit unsigned, the calculations are carried out at 26-bit two's complement to prevent the first equation from overflowing, and to guarantee the correct sign in the result of the second equation. AOR 226 values are 24 bits and unsigned.

The above-described equations allow circular addressing within a predefined region because of the end detection and hardware modulo addressing. Regions can reside anywhere in physical memory based on the contents of the region SPRs. Multiple delay lines coexist in the same region by stringing them end to end and addressing them with different offsets. Delay lines move only within the extents of the defined region. Therefore, the operation of delay lines does not impact data in other regions of memory. Delay lines are useful for audio effects such as reverb and for digital filtering.

By setting the END register to the maximum physical memory location, the entire region simplifies to a table without modulo addressing. Setting BASE to zero and END to maximum physical location results in absolute addressing suitable for I/O devices.

An automatic method for updating the BASE register is also provided via AGEN 216. This mechanism is especially useful for auto-incrementing the BASE register every sample period in a modulo fashion as desired using delay lines. AGEN 216 computes a new address using the contents of a location in AOR 226 (pointed to by the G operand field) as the increment amount. The only difference is that the AGEN opcode field of the instruction causes the result to be written to the BASE register as well as to the address bus.

```
address = AOR + BASE
temp = address − END
if temp > 0
    address = address − (SIZEM1 + 1)
base = address
```

To decrement the BASE by 1, set AOR equal to SIZEM1. The new BASE value is immediately available to the AGEN on the next instruction.

It should be noted that if base updating is specified in a given instruction, a collision could occur between AGEN 216 and MAC/BS 220 trying to write to the same BASE register because the two units are operating with the same timing.

AGEN Operations

In the exemplary embodiment, the opcode field of AGEN 16 consists of six instruction bits. Three of the bits are used for selecting one of eight regions. The remaining three bits are used to select from the following operations as listed in Table V:

TABLE V

| Operation |
| --- |
| External memory read |
| Ext. memory write |
| Ext. memory read, update BASE |
| Ext. memory write, update BASE |
| Ext. mem. read, plus 1 addressing |
| Ext. mem. write, plus 1 addressing |
| NOP cycle on the external memory bus |
| Update BASE |

A NOP on the external memory bus means that the bus is not activated; it does not inhibit the operation of AGEN 16. Updating the region BASE SPR without activating the external memory bus is also possible.

Accessing the Region Registers and AORs

The region registers are mapped as SPRs for use as operands by ALU 218 and MAC/BS 220. This is useful for having more than eight regions active at a time, since the contents of these registers can be modified during a sample period under program control. As mentioned, AOR 226 can also be accessed by ALU 218 and MAC/BS 220 to provide the capability for computing addresses in a program. Because of bandwidth limitations on AOR 226, AOR 226 locations should not be used as the E operand of MAC/BS 220.

Address Bus

The address bus is controlled by the ESP2 for supplying a 24-bit address to external memory and to I/O devices. A bit selectable multiplexed addressing mode is available which provides multiplexed addresses for accessing DRAMs in sizes from 64K to 16M.

Data Interface

Referring back to FIG. 2, the interface from the ESP2 chip's internal computational units to external memory is supplied through SPRs (DILs and DOLs) 228.

There are 16 DIL SPRs and 16 DOL SPRs each being 24 bits wide. These registers are accessed by the microprogram as sources and destinations like any other SPR. A 4-bit field in the instruction along with a read/write bit serve as the address to one of these registers. The DIL and DOL SPRs are readable and writable from MAC/BS 220 and ALU 218. It should be noted that an assembler can organize the use of these registers into FIFO and/or cache-like structures.

The DOL SPRs provide an added feature called magnitude truncation aimed at reducing truncation error in 24-bit and 16-bit systems. This feature is controlled by two bits in a HARD_CONF register. The MAG_TRUNG bit enables magnitude truncation when it is high. The TRUNC_WIDTH bit sets the word width to 24-bits when it is high or 16-bits when it is low. In the case of 24-bit words, the algorithm is as follows:

```
if (DOL < 0)
    DOL = DOL + h1
```

In the case of 16-bit words, the algorithm is as follows:

```
if (DOL < 0)
    DOL = (DOL + h100)
    DOL = DOL & HFFFF00
```

It should be noted that rules of truncation dictate that the truncated value should approach 0, thus, "h1" is added to a 24-bit negative value (i.e., increment bit 1 of a 24-bit value: the 1st bit) and "h100" is added to a 16-bit negative value (i.e., increment bit 1 of a 16-bit value: the 9th bit). Additionally, for 16-bit words, the 8 LSBs of the word are set to h00 which allows the development of algorithms for 16-bit target systems in 24-bit development systems.

Internal Register Refresh

Most of the chip's registers are implemented in dynamic RAM and therefore require a periodic refresh of their contents. This applies to instruction memory 222, GPR 224, and AOR 226. The SPRs are implemented as static registers and do not require refresh.

Instruction Memory Refresh

Instruction memory 222 refresh is transparent to a programmer. There are four memory accesses available in instruction memory 222 per instruction cycle. These consist of two reads and two writes. One read is required for instruction fetching based on the PC, leaving 3 accesses unused. The one unused read and one of the unused writes are used to allow host access to instructions when a host access is pending, or to perform refresh when no host access is pending. Refresh is performed based on the REFINST SPR which is a 10-bit counter. Although the current implementation of the chip has only 300 instructions, the counter is allowed to count from 0 to 1023 for future expandability of the instruction array. Since each instruction is refreshed once every 1024 instruction cycles, the refresh rate at a 100 ns/instruction is 102.4 us.

A bit in the HARD_CONF register can be used to enable or disable instruction refresh to ease debugging in the early stages of chip development.

GPR 224 and AOR 226 Refresh

GPR 224 allows for 6 accesses per instruction cycle: 4 for fetching source operands for ALU 218 and MAC/BS 220 and 2 for writing results of ALU 218 and MAC/BS 220 operations. AOR 226 allows for 6 accesses per instruction cycle 1 for reading an offset for AGEN 216, 3 for reading source operands for ALU 218 and MAC/BS 220, and 2 writes for writing ALU 218 and MAC/BS 220 results to AOR 226. In both cases, there are no available accesses for refreshing the registers.

Refresh of these registers is performed via instructions using special SPRs to provide hardware support for the refresh operation. The instructions provide refresh as an ALU function (NOP, BIOZ, HOST) or the MAC function (RFSH). These instructions use the indirect addressing mechanism provided by the REF and REFPT SPRs.

The SPRs REF and REFPT control the refresh mechanism as follows:

The reserved SPR address called REF provides an indirect addressing mechanism. By addressing REF in the operand field of an instruction, the contents of REFPT are actually used as the address of the operand. REFPT is a 10-bit counter which post-increments whenever the REF reserved address is used as a source operand.

Because of the address mapping of GPRs from 0 to 255, and AORs from 512 to 767, the LSB of the counter serves as the MSB of the address, so refreshes alternate between GPR and AOR. Although REFPT is a 10-bit counter, in the exemplary embodiment, the count is limited to 512 which matches the number of locations physically implemented in GPR 224 and AOR 226.

Due to the interleaved nature of MAC/BS 220 and ALU 218 operand fetching, one of these functional units can be writing a new result to a register at the same time that the other unit is being used to refresh it.

The chip contains logic to prevent a refresh operation from writing old data over newly created register contents. When REF is used as a destination in a MAC/BS 220 operation, special hardware compares the contents of REFPT to the destination address of ALU 218 operation in the preceding instruction. If the values are equal and the ALU operation is not skipped, a NOP is performed by MAC/BS 220 instead of the refresh.

Likewise, when REF is used as a destination if the ALU, the chip compares contents of REFPT to the destination address of MAC/BS 220 in the same instruction line. If the values are equal and the MAC instruction is not skipped, a NORFSH is inserted in the ALU operation.

In normal audio processing applications, use of the BIOZ instruction and available ALU NOPs for sample synchronization should provide effective refresh. Additional refresh can be provided by using MAC/BS 220 RFSH pseudo-instruction instead of a NOP in places where preservation of MACRL 334 is unnecessary.

It should be noted that MAC/BS 220 and ALU 218 can be used to perform refresh operations simultaneously which doubles the refresh rate.

When the chip is suspended due to a BIOZ microinstruction or because of high halt bits in the HOST_CNTL register, MAC/BS 220 executes NOPs (which preserve MACRL 334) while ALU 218 executes the HOST instruction to allow host access and refresh.

In this suspended state, MAC/BS 220 can be forced to do refresh by setting the HALT_MAC_REF bit in the HARD_CONF register. This has the effect of doubling the refresh rate only during a BIOZ loop, however, the contents of MACRL 334 will not be preserved as they are during a MAC/BS 220 NOP. When the micro-program resumes (i.e., comes out of suspension), MACRL 334 is subsequently preserved, assuming no RFSH instructions in the MAC/BS 220, at least until the next BIOZ is encountered.

Halting the Chip

The chip can be halted unconditionally by writing the HOST_HALT bit of the HOST_CNTL register. The HOST_CNTL register is accessible directly from the HOST and is also accessible as an SPR by ALU 218 and MAC/BS 220. The chip can be taken out of the halt state only by the host clearing the ESP_HALT and HOST_HALT bits of the HOST_CNTL register. While halted, the program counter does not increment, therefore, execution resumes at the next unexecuted instruction in the sequence.

A mechanism for conditional halting under program control exists through the HALT pseudo-instruction of ALU 218. This instruction can be used to set the ESP_HALT bit in the HOST_CNTL register. If the ESP_HALT_EN bit (which is also located in the HOST_CNTL register) is also set, the chip goes into a halt state. If the ESP_HALT_EN bit is not set, the ESP_HALT bit is ignored. This allows program debugging by placing HALT pseudo-instructions throughout a program as breakpoints. The breakpoints can be activated by setting the ESP_HALT_EN bit or they can be ignored to allow normal execution of the program.

A third method for "halting" the chip is by bringing the IOZ_EN bit of the HOST_CNTL register low. This disables the observation of the IOZ input pin, and hence, suspends microprogram execution when a BIOZ microinstruction is encountered. This causes the chip to effectively halt when the next BIOZ instruction is executed because the IOZ bit in the CCR register never goes high to allow the program to resume.

To preserve the state of the chip during a halt, the ALU 218, MAC/BS 220, and AGEN 216 perform operations which are non-destructive to the state of GPR 224, AOR 226 and desired SPR.

HOST/ESP2-Interface

The purpose of the host interface is to read or write all the ESP2 registers and program memory. The mechanism for doing so is described below.

The host interface consists of five address pins HA[4:0], eight data pins HD[7:0], a read/write pin HR/W and a chip select pin CS\ (note that by convention the suffix "\" indicates an active low signal). HA and HR/W\ are latched on the falling edge of CS\. In a read cycle, ESP2 asserts the HD pins with a read data while CS\ is LOW. In a write cycle, the HD pins propagate into the addressed register and are latched on the RISE of CS\.

Although the invention is illustrated and described herein embodied as a digital signal processor specially designed for audio applications, the invention is nevertheless not intended to be limited to the details as shown. Rather, various modifications may be made in the details within the scope and range of equivalents of the claims and without departing from the spirit of the invention.

What is claimed:

1. A digital signal processor for efficiently handling audio applications comprising:

an instruction memory which holds instructions representing a program for an audio application, wherein the instruction memory includes an output port which provides microinstruction words;

bus means for providing data communication within the digital signal processor, wherein the bus means comprises W, X, Y, and Z busses, at least two of the W, X, Y and Z busses being time-division multiplexed;

arithmetic logic unit (ALU) means for performing a plurality of arithmetic and logical functions in response to a microinstruction word, the ALU being coupled to the bus means;

multiplier accumulator/barrel shifter (MAC/BS) means for performing a plurality of multiply/accumulate and shifting functions in response to a microinstruction word, the MAC/BS means being coupled in parallel with the ALU means such that the MAC/BS is coupled to the bus means;

address generator (AGEN) means, coupled in parallel with the ALU means and the MAC/BS means and having at least one data input port coupled to the W bus, for performing a plurality of address calculation functions in response to a microinstruction word;

first memory means, responsive to a microinstruction word, for exchanging data with the bus means, the first memory means includes a general purpose register (GPR) memory means and a special purpose register (SPR) memory means;

address offset register (AOR) memory means, separate from the first memory means and responsive to a microinstruction word, for exchanging data with the bus means, wherein the AOR memory means is the only source of data values for the W bus;

wherein the microinstruction word is sufficiently long to allow independent and simultaneous control of operation and operands for each of the ALU means, MAC/BS means and AGEN means.

2. The digital signal processor of claim 1, the X, Y and Z bus means being time-division multiplexed using a two-phase microinstruction cycle in order to allow the ALU means, the MAC/BS means, and the AGEN means to concurrently latch, store, and operate on data values.

3. The digital signal processor of claim 1, further including a condition code means responsive to the result of an ALU means operation and a programmable condition mask means, the condition code means and the condition mask means having respective states, each of the ALU means, the MAC/BS means and the AGEN means, as a function of the respective states of the condition code means and condition mask means, independently skip the present microinstruction word.

4. The digital signal processor of claim 1, wherein the MAC/BS means comprises:

multiplier means responsive to a microinstruction word for multiplying the values provided by the X and Y bus means to produce a product output value;

accumulator means responsive to the microinstruction word for accumulating the product output value provided by multiplier means with a feedback value and for providing the accumulated values as an output value;

MAC latch means for holding and providing the output value provided by the accumulator means;

MAC Preload latch means for holding and providing a value which is received directly from the Z bus means;

selecting means for selecting and outputting one of the output values of the accumulator means, the MAC latch means, the MAC Preload latch means, and a constant zero value means; and a single barrel shifter means responsive to the microinstruction word for shifting an input value and producing an output, the output of the barrel shifter means provides the feedback value, the barrel shifter means being capable of shifting both the input value at a beginning of a microinstruction cycle and the input value at an end of the microinstruction cycle in order to shift both an input to the accumulator means and the output of the accumulator means during the same microinstruction cycle.

5. The digital signal processor of claim 4, wherein the MAC latch means is selectively inhibited from holding the output value provided by the accumulator means as a function of the microinstruction word.

6. The digital signal processor of claim 4, further comprising:

overflow detect means for detecting and saturating an overflow/underflow of the output value of the barrel shifter means and for producing an output value based on the detection.

7. The digital signal processor of claim 1, wherein the MAC/BS means comprises:

multiplier means responsive to the microinstruction word for multiplying the values provided by the X and Y bus means to produce a product output value;

accumulator means responsive to the microinstruction word for accumulating the product output value provided by multiplier means with a feedback value and for providing the accumulated values as an output value;

MAC latch means for temporarily storing the output value provided by the accumulator means;

MAC Preload latch means for temporarily storing a value which is received directly from the Z bus means;

selecting means for selecting and providing one of the output value of the accumulator means, the value stored in the MAC latch means, the value stored in the MAC Preload latch means and a constant zero value;

barrel shifter means responsive to the instruction memory output for shifting the output value provided by selecting means to more or less significant bit positions and for producing an output value, wherein said barrel shifter means output provides the feedback value; and overflow detect means for detecting an overflow/underflow of the output value of the barrel shifter means and for producing an output signal based on the detection.

8. The digital signal processor of claim 1, wherein the ALU means includes:

decoder means for decoding one of a double precision shift high function and a double precision shift low function from the microinstruction word provided by the instruction memory and for producing an output signal;

means, responsive to the output signal of the decoder means, for selecting a 24 bit value from a 48-bit input value, the 48-bit input value comprising an A operand and a B operand, the means for selecting 1) selects the B operand and the most significant 8 bits of the A operand if the output signal of the decoder means indicates the function is the shift-high function and 2) selects and outputs the most significant 8 bits of the B operand, the A operand and a byte of logic "0"s if the decoder means output indicates the function is the shift-low function; and means, responsive to the microinstruction word, for shifting values selected by the means for selecting and for outputting a 24-bit result, wherein the selecting and shifting are performed in a single microinstruction cycle.

9. The digital signal processor of claim 1, wherein the ALU means includes:

decoder means for decoding an average function from the microinstruction word provided by the instruction memory and for producing an output signal;

adder means, responsive to the output signal of the decoder means, for adding two operands received at the two input ports further including means for accommodating an overflow occurrence during the addition; and right shift by 1 means, directly coupled after and in series with the adder means, and responsive to the microinstruction word for performing a right shift by 1, wherein the adding of the adder means and the shifting of the right shift by 1 means are performed in a single microinstruction cycle.

10. The digital signal processor of claim 1, further comprising:

decoder means for decoding a BIOZ instruction from the microinstruction word provided by the instruction memory and producing a BIOZ signal;

means, responsive to the BIOZ signal and an external input, for setting BIOZ indicators within the digital signal processor to indicate that the ALU means is in a BIOZ mode;

means, responsive to the BIOZ indicators, for synchronizing the ALU means operation to an external sample rate clock signal; and means, responsive to the BIOZ indicators, for replacing a value in an opcode field and address fields of a microinstruction with a predetermined opcode value and predetermined address values prior to execution of the microinstruction to provide at least a host processor with access to digital signal processor.

11. The digital signal processor of claim 1, wherein the ALU means includes:

decoder means for decoding a limit instruction from the microinstruction word and for producing an output value;

means for comparing a first operand to a second operand to produce an output value, the first operand representing a limit value and the second operand representing a ramping value, wherein the second operand is modified by an increment value prior to a subsequent execution of a limit instruction;

logic means for performing an exclusive-OR operation on the output value, provided by the means for comparing, and a flag value indicating whether an immediately preceding first operand was positive, and for producing an output signal, wherein the immediately preceding first operand represents the increment value; and means, responsive to the output signal of the logic means, for selecting one of the first and second operand values.

12. The digital signal processor of claim 1, wherein the microinstruction includes address fields, further comprising:

decoder means for decoding a HOST instruction from the microinstruction word and for producing an output; and means, responsive to the decoder means output signal, for replacing values in the address fields of the microinstruction with predetermined address values prior to execution of the microinstruction by the ALU means, MAC/BS means and AGEN means to provide synchronization for a transfer of data between a host processor and storage locations within the digital signal processor.

13. The digital signal processor of claim 1, further comprising:

comparing means for comparing an indirection activation address to an operand address of a microinstruction word and producing an output indicating if the indirection activation address and the operand address are equal; and means for replacing, as a function of the comparing means output, the operand address of the microinstruction with a value contained in the SPR memory means prior to execution of the microinstruction by the ALU means, MAC/BS means and AGEN means, wherein the value in the SPR memory means is an indirection operand address.

14. The digital signal processor of claim 1, wherein the AGEN means comprises:

first selecting means for selecting and outputting a value from one of a plurality of SPR memory means locations in response to the microinstruction word, the value comprises a base value, an end value and a sizem1 value;

first adder means for adding the first selecting means base value to a value provided on the W bus means by the AOR memory means and producing an output;

second adder means for subtracting the selecting means end value from the first adder means output and producing an output;

third adder means for subtracting the selecting means sizem1+1 value from the first adder means output and producing an output; and second selecting means for selecting and outputting one of the first adder means output and the third adder means output in response to the sign of the second adder means output, the second selecting means output being fed back to the SPR memory.

15. The digital signal processor of claim 14, wherein the values of base, sizem1 and end specify, in one of modulo and non-modulo modes, regions in external physical memory.

16. The digital signal processor of claim 14, wherein the AOR memory means provides address offsets to the W bus and provides source and destination operands for the MAC/BS means and ALU means to the bus means.

17. A multiplier accumulator/barrel shifter (MAC/BS) means coupled to a bus means including an X bus, a Y bus and a Z bus for performing a plurality of MAC and shifting functions in response to an instruction word comprising:

multiplier means responsive to the instruction word for multiplying the values provided to input ports by the X and Y busses to produce a product output value;

accumulator means responsive to the instruction word for accumulating the product output value provided by multiplier means with a feedback value and for providing the accumulated values as an output value;

MAC latch means for temporarily storing the output value provided by the accumulator means;

MAC Preload latch means for temporarily storing a value which is received directly from the Z bus;

selecting means for selecting and outputting one of the output values of the accumulator means, the value stored in the MAC latch means, the value stored in the MAC Preload latch means, and a constant zero value; and a single barrel shifter means responsive to the instruction word for shifting an input value and producing an output, the output of the barrel shifter means provides the feedback value, the barrel shifter means being capable of shifting both the input value at a beginning of an instruction cycle and the input value at an end of the instruction cycle in order to shift both an input to the accumulator means and the output of the accumulator means during the same instruction cycle.

18. The MAC/BS means of claim 17, wherein the MAC latch means is selectively inhibited from holding the output value provided by the accumulator means as a function of the instruction word.

19. The MAC/BS means of claim 17, further comprising:

overflow detect means for detecting and saturating an overflow/underflow of the output value of the barrel shifter means and for producing an output value based on the detection.

20. A multiplier accumulator/barrel shifter (MAC/BS) means coupled to a bus means including an X bus, a Y bus and a Z bus for performing a plurality of multiply/accumulate and shifting functions in response to an instruction word comprising:

multiplier means responsive to the instruction word for multiplying the values provided by the X and Y busses to produce a product output value;

accumulator means responsive to the instruction word for accumulating the product output value provided by multiplier means with a feedback value and for providing the accumulated values as an output value;

MAC latch means for temporarily storing the output value provided by the accumulator means;

MAC Preload latch means for temporarily storing a value which is received directly from the Z bus;

selecting means for selecting one of the output value of the accumulator means, the value stored in the MAC latch means, the value stored in the MAC Preload latch means and a constant zero value, the selecting means provides the selected value as an output value;

barrel shifter means responsive to the instruction word for shifting the output value provided by the selecting means to more or less significant bit positions and for producing an output value, said barrel shifter means output provides the feedback value; and overflow detect means for detecting an overflow/underflow of the output value of the barrel shifter means and for producing an output signal based on the detection.

21. An address generator (AGEN) means coupled to a bus means for performing a plurality of address calculation functions in response to a microinstruction word comprising:

first memory means, responsive to a microinstruction word, for exchanging data with the bus means, the first memory means includes a general purpose register (GPR) memory means and a special purpose register (SPR) memory means;

address offset register (AOR) memory means, separate from the first memory means and responsive to a microinstruction word, for exchanging data with the bus means, wherein the AOR memory means is the only source of data values for the W bus;

first selecting means for selecting and outputting a value from one of a plurality of SPR memory means locations in response to the microinstruction word, the value comprises a base value, an end value and a sizem1 value;

first adder means for adding the first selecting means base value to a value provided on the bus means by the AOR memory means and producing an output;

second adder means for subtracting the selecting means end value from the first adder means output and producing an output;

third adder means for subtracting the selecting means sizem1+1 value from the first adder means output and producing an output; and second selecting means for selecting and outputting one of the first adder means output and the third adder means output in response to the sign of the second adder means output, the second selecting means output being fed back to the SPR memory.

22. The AGEN means of claim 21, wherein the values of base, sizem1 and end specify, in one of modulo and non-modulo modes, regions in external physical memory.

* * * * *